United States Patent [19]
Houde

[11] Patent Number: 5,905,958
[45] Date of Patent: *May 18, 1999

[54] INTELLIGENT MOBILE STATION FOR A CELLULAR TELECOMMUNICATIONS NETWORK

[75] Inventor: Michel Houde, St. Laurent, Canada

[73] Assignee: Telefonaktiebolaget LM Ericsson, Stockholm, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/617,139

[22] Filed: Mar. 18, 1996

[51] Int. Cl.⁶ .................................................. H04Q 7/32
[52] U.S. Cl. ........................ 455/437; 455/417; 455/445
[58] Field of Search ..................... 455/414, 445, 455/403, 422, 433, 437, 438, 428, 425, 417, 418, 415, 435; 379/207, 230

[56] References Cited

U.S. PATENT DOCUMENTS

| | | | |
|---|---|---|---|
| 4,839,628 | 6/1989 | Davis et al. | 340/311.1 |
| 5,012,234 | 4/1991 | Dulaney et al. | 340/825.44 |
| 5,040,177 | 8/1991 | Martin et al. | 370/110.1 |
| 5,319,699 | 6/1994 | Kerihuel et al. | 379/58 |
| 5,329,578 | 7/1994 | Brennan et al. | 379/67 |
| 5,333,178 | 7/1994 | Norell | 379/59 |
| 5,345,502 | 9/1994 | Rothenhofer | 379/207 |
| 5,353,331 | 10/1994 | Emery et al. | 379/58 |
| 5,400,390 | 3/1995 | Salin | 379/59 |
| 5,469,496 | 11/1995 | Emery et al. | 455/445 |
| 5,473,671 | 12/1995 | Partridge, III | 455/417 |
| 5,504,804 | 4/1996 | Widmrak et al. | 455/414 |
| 5,509,062 | 4/1996 | Carlsen | 455/461 |
| 5,559,860 | 9/1996 | Mizikovsky | 455/415 |
| 5,577,102 | 11/1996 | Koivunen | 379/433 |
| 5,577,103 | 11/1996 | Foti | 455/414 |
| 5,579,375 | 11/1996 | Ginter | 455/433 |
| 5,594,779 | 1/1997 | Goodman | 455/414 |
| 5,594,949 | 1/1997 | Anderson et al. | 455/437 |
| 5,621,785 | 4/1997 | Norimatsu | 455/433 |
| 5,628,051 | 5/1997 | Salin | 455/433 |
| 5,651,053 | 7/1997 | Mitchell | 379/207 |
| 5,657,383 | 8/1997 | Gerber et al. | 379/207 |
| 5,734,981 | 3/1998 | Kennedy, II et al. | 455/445 |

FOREIGN PATENT DOCUMENTS

WO 92/04798  3/1992  WIPO .

OTHER PUBLICATIONS

A. Batten Personal Communications Services and the Intelligent Network, Aug. 1990.

Bijan Jabbari Intelligent Network Concepts in Mobile Communications, Feb. 1992.

Paul Van Hal Service Script Interpreter, An Advanced Intelligent Network Platform, Jan. 4, 1990.

David R. Wilson; "Signaling System No. 7, IS–41 and Cellular Telephony Networking"; *Proceedings of the IEEE*; vol. 80, No. 4, Apr. 1, 1992, pp. 644–652.

*Primary Examiner*—Dwayne D. Bost
*Assistant Examiner*—Jean A. Gelin
*Attorney, Agent, or Firm*—Steven W. Smith

[57] ABSTRACT

An intelligent mobile station for use in a cellular telecommunications network. The mobile station comprises a microprocessor that controls the mobile station and enables the mobile station to interface with the cellular telecommunications network and to execute enhanced subscriber services; a script memory connected to the microprocessor which stores service script logic; and a data memory connected to the microprocessor for storing script-related data required for executing the service script logic. The mobile station may collect script-related data from the cellular telecommunications network and the Public Switched Telephone Network (PSTN). The mobile station may also transmit to the cellular telecommunications network and the PSTN, instructions for executing the enhanced subscriber services.

29 Claims, 15 Drawing Sheets

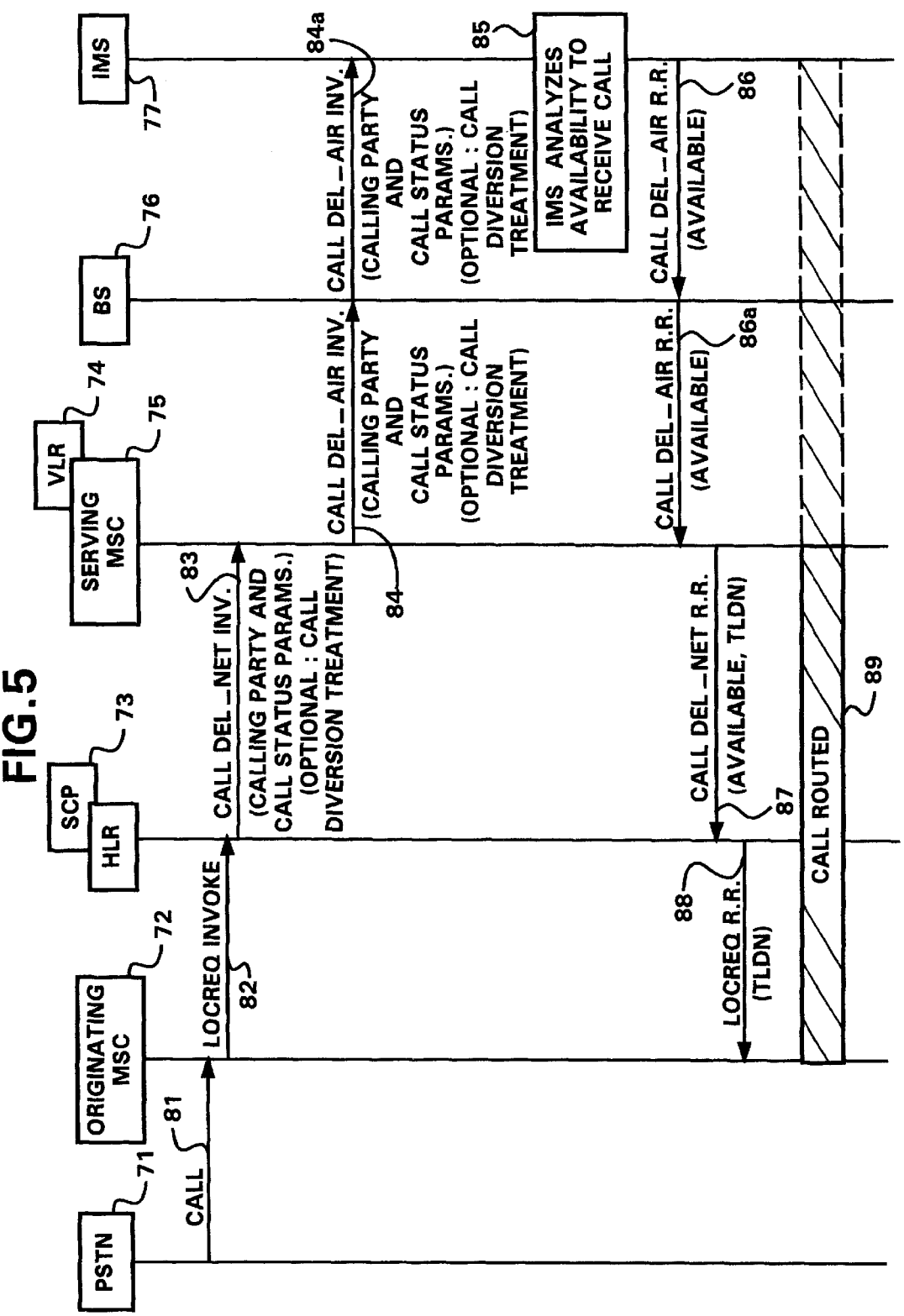

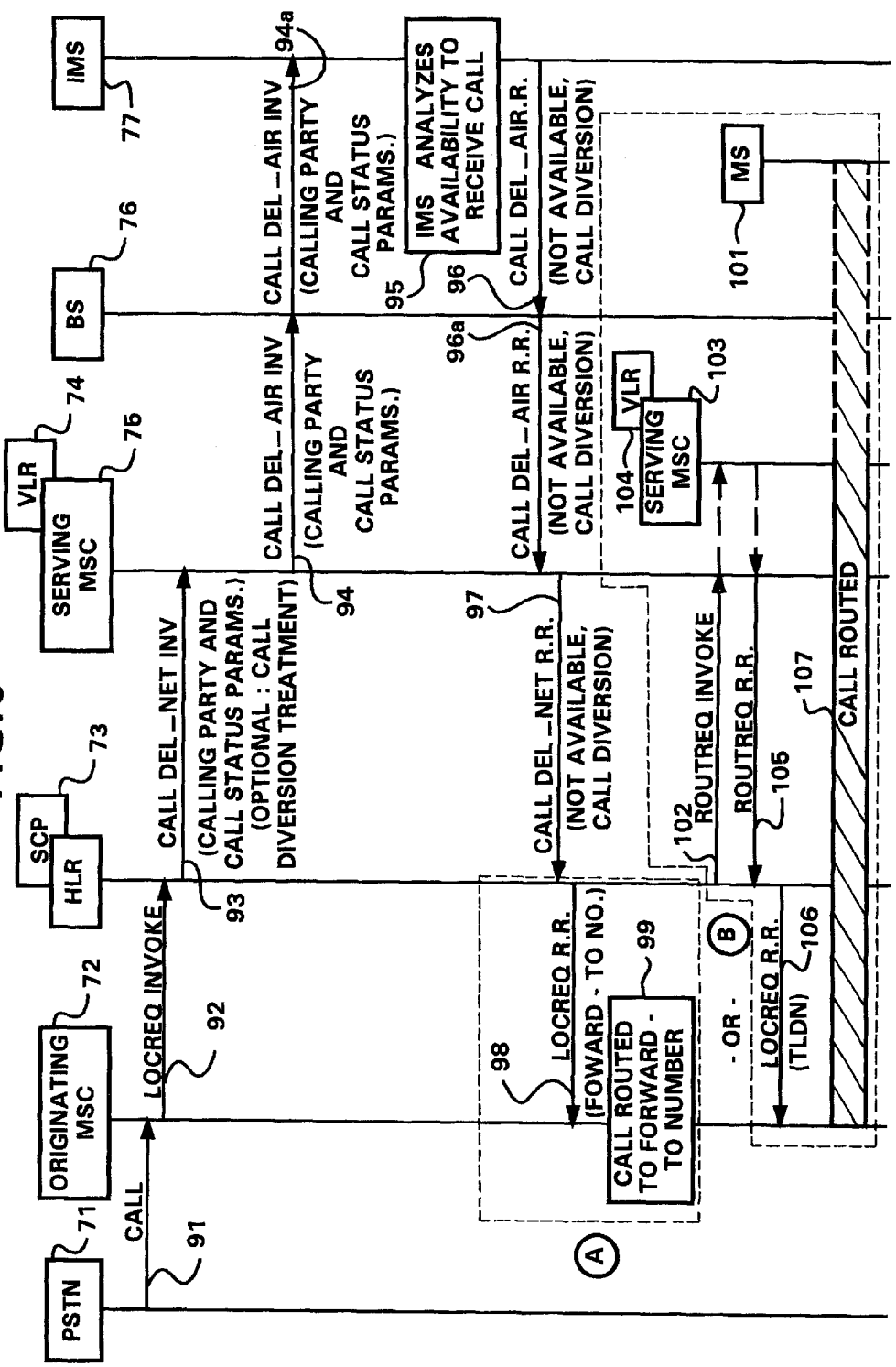

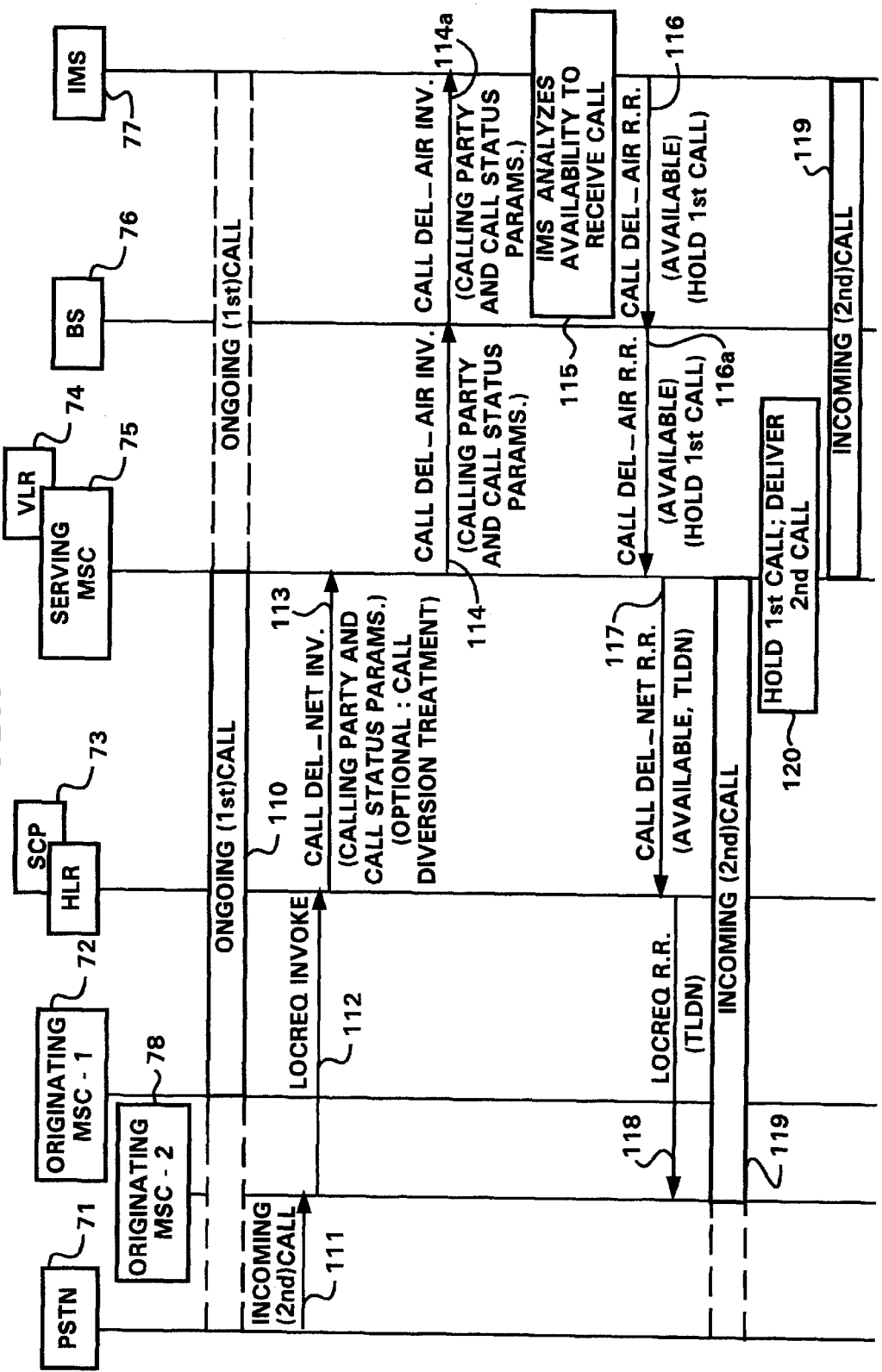

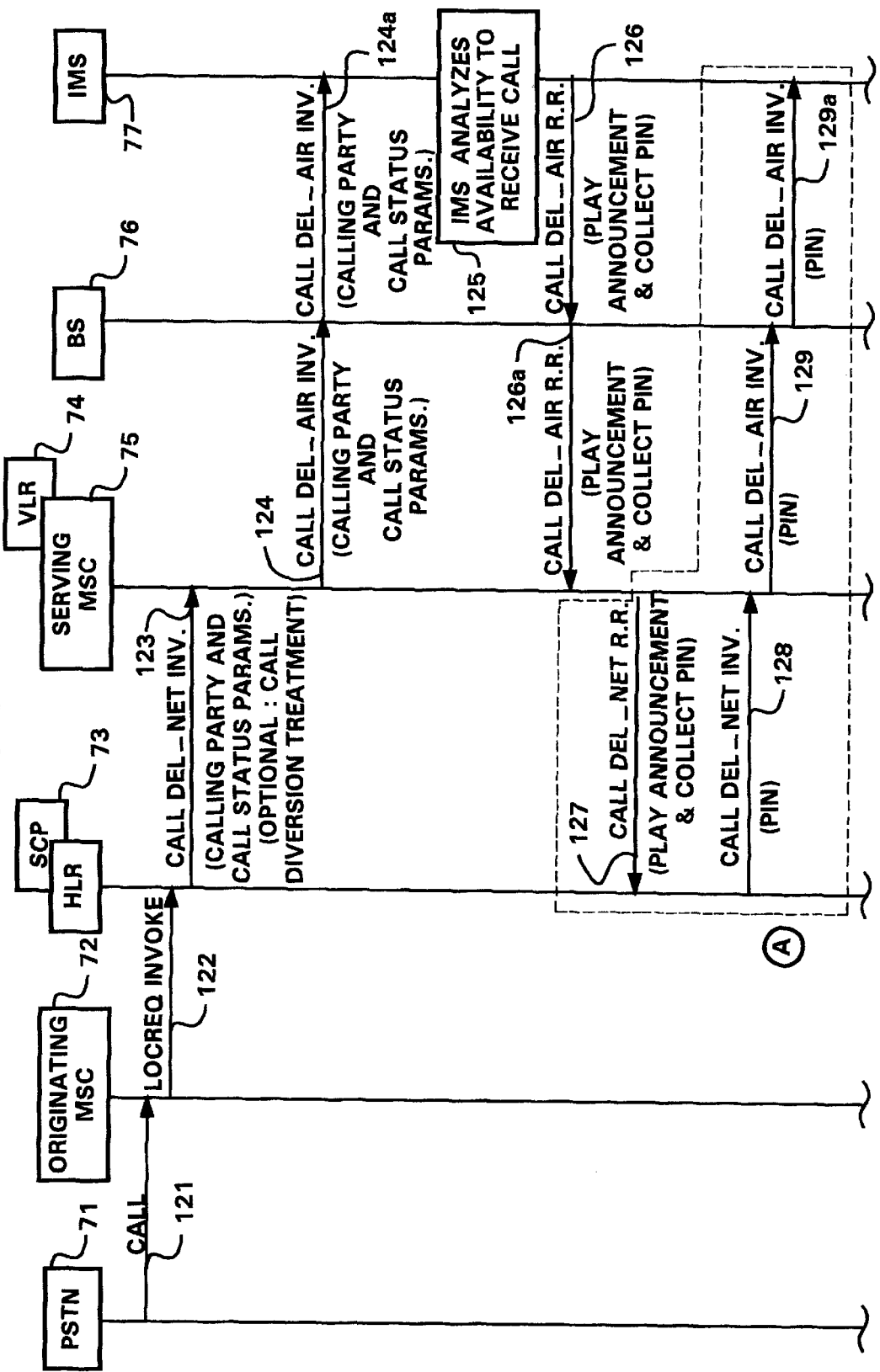

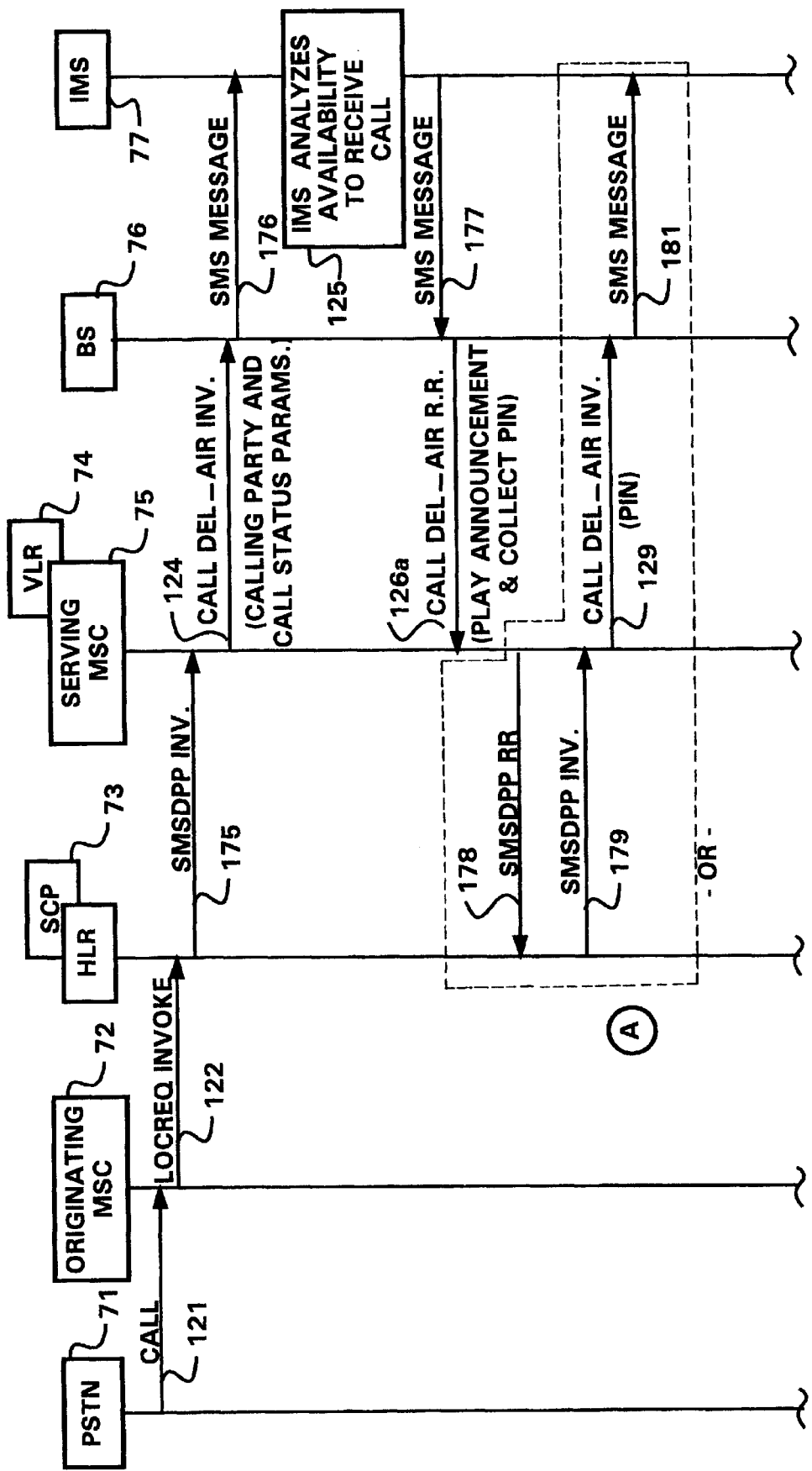

INTELLIGENT MOBILE STATION FOR A CELLULAR TELECOMMUNICATIONS NETWORK

BACKGROUND OF THE INVENTION

1. Technical Field of the Invention

This invention relates to cellular telecommunications networks and, more particularly, to an intelligent mobile station that stores, retrieves, and executes enhanced subscriber services in a cellular telecommunications network.

2. Description of Related Art

In modem telecommunication systems, it has become increasingly important for network operators to be able to provide their subscribers with enhanced subscriber services. These services may include the provision of an 800 Services Database, a Credit Card Verification Database, Geographic Call Routing, Incoming Call Routing, Multi-location Extension Dialing, Network Automatic Call Distribution, Flexible Call Routing, Flexible Carrier Selection, CLASS Calling Name Delivery Database, and others. In wireline telephone systems, such enhanced subscriber services may be provided through an Intelligent Network (IN) (e.g., Bellcore Advanced Intelligent Network (AN) or its CCITT/ITU equivalent: ITUms, CS-1, Q. 1200, etc.).

FIG. 1 is a simplified block diagram of a typical wireline telecommunication system using an IN to provide enhanced subscriber services. The exemplary network in FIG. 1 utilizes a Bellcore AIN. The AIN 12 and its associated Signaling System Number 7 (SS7) protocol are described in the Bellcore recommendation, "TR-NWT-000246, Bell Communications Research Specification of Signaling System Number 7," which is incorporated by reference herein. A large number of Local Switches (LSs) 13a–n may be connected to a Service Switching Point/Tandem (SSP/T) 14 via multi-frequency IF) links 15. A "tandem", as used herein, may be a local, LATA, or access tandem. The LSs 13a–n provide connections for subscribers 16a–n into the telecommunications system 11. The AIN 12 uses a system of high speed telecommunications links known as a Common Channel Signaling (CCS) network which employs the standard SS7 signaling protocol to link all of the components of the AIN 12. Standard telephony diagrams, and FIG. 1 herein, indicate lifiks utilizing the SS7 signaing protocol as dotted lines and MF trunks as solid lines.

The components of the AIN 12 may include the SSP/T 14, one or more Signal Transfer Points (STPs) 18a–n which act as intermediate switching nodes, and one or more Service Control Points (SCPs) 19a–n. The SCPs 19 each contain a database of enhanced subscriber services which are accessed and controlled by a Service Logic Program (SLP). The SCP 19 currently utiiizes a standardized protocol known as Transaction Capabilities Application Part (TCAP) for coordination of functions. The current version of the protocol required for communication with the SCP 19 is TCAP/AMN Release 0.1. The SCP 19 is described in the Bellcore recommendation, "TA-NWT-001280, Advanced Intelligent Network (AIN) Service Control Point (SCP) Generic Requirements," which is incorporated by reference herein. The SCP 19 acts as a repository for enhanced subscriber services which may be accessed by any one of the LSs 13a–n. In the past, each LS had to be individually upgraded with enhanced subscriber services. With the implementation of the AIN 12, and the required communications capabilities in the LSs, new enhanced services need only be added to the SCP 19.

As seen from the above description, intelligent networks have been developed strictly as wireline communication systems. The signaling protocol utilized for intelligent networks allows only for control of telephone network switching elements in response to queries originated by network switching elements. The fixed nature of installed wirelines limits the utilization of intelligent networks. Therefore, following the development of intelligent networks, it was recognized that it would be beneficial for wireless communication systems to be able to access the intelligent networks as well. Systems have been proposed that enable mobile telephone users to access intelligent networks and retrieve enhanced services from the SCP.

One such system is described in U.S. Pat. No. 5,353,331 to Emery et al. (Emery). Emery discloses an integrated wired and wireless communications network that utilizes a SCP in an AIN to store enhanced subscriber services. A mobility controller (MC) is provided to enable access by mobile subscribers in a cellular telecommunications network. The cellular telecommunications network includes a home location register (HLR) which includes a database of subscriber information including location information and subscriber profiles for mobile stations known by that HLR. In Emery, the HLR and the SCP communicate via the TCAP communications protocol.

A major problem with systems such as Emery which integrate wireless communication systems with the existing wireline AIN is that they require that the TCAP protocol be utilized for communication with the SCP and access to enhanced services. It is a very expensive and inefficient process for equipment suppliers in the cellular telecommunications industry to modify their equipment to utilize the TCAP protocol. In addition, the storing of enhanced services in a centralized SCP in a wireline AIN places restrictions on mobile stations and the freedom they have to access enhanced services in the cellular network. There is no known solution to the above mentioned deficiency and shortcoming of existing systems for providing mobile subscribers with enhanced subscriber services.

In another proposed cellular telecommunication system, the functionality of the SCP is implemented in the HLR. All intelligent processing required to deliver calls is performed within the cellular network, in the HLR/SCP. The HLR/SCP locates the subscriber, assesses the subscriber's availability to receive calls, and routes incoming calls to the subscriber's serving MSC. In addition, the HLR/SCP transfers calls to other numbers or locations if call delivery does not succeed on the first attempt or if enhanced services stored in the HLR/SCP direct such call diversion.

In all this process, the HLR/SCP is a controlling, centralized "brain" of the operation. The mobile station is a "slave" to this brain. As a result, if a subscriber desires a particular service that is tailored to the subscriber's individual needs or desires, he must wait for a service provider to implement the service in the HLRISCP. This could mean major delays for the subscriber, or the service may never be implemented at all.

It would be a distinct advantage to have a system which provides mobile subscribers with enhanced subscriber services and does not require access to the wireline AIN or modification of cellular equipment to utiiize the TCAP protocol. Additionally, it would be advantageous for the source of intelligent processing to be decentralized in the cellular network rather than concentrated in the HLR/SCP. This would provided greater freedom to subscribers to customize their own services and implement enhanced services when desired. The present invention provides such a system.

SUMMARY OF THE INVENTION

It is an object of the present invention to provide a cellular telecommunications network with decentralized intelligence resident in a plurality of intelligent mobile stations (IMSs) in a cellular telecommunications network.

It is another object of the present invention to provide cellular subscribers with the capability to define and implement customized subscriber services through the intelligent mobile station.

Thus, in one aspect, the present invention is a system for providing mobile subscribers in a cellular telecommunications network with intelligent network (IN) services without accessing the cellular network or the public switched telephone network (PSTN), in order to execute the logic of IN services in their entirety. The system includes an intelligent mobile station that stores, retrieves, and executes enhanced subscriber services by executing the steps defined in a service script.

In another aspect, the present invention is an intelligent mobile radio telecommunications network comprising a plurality of intelligent mobile stations for decentralized storing of intelligent network (IN) services.

In yet another aspect, the present invention is a method of providing mobile subscribers in a cellular telecommunications network with intelligent network (IN) services without accessing the cellular network or the public switched telephone network (PSTN) in order to execute the logic of the services in their entirety. The method includes storing enhanced subscriber services in an intelligent mobile station that retrieves and executes the services, thus providing greater freedom to mobile subscribers to customize and implement their own services.

BRIEF DESCRIPTION OF THE DRAWINGS

The invention will be better understood and its numerous objects and advantages will become more apparent to those skilled in the art by reference to the following drawing, in conjunction with the accompanying specification, in which:

FIG. 5 is a message flow diagram illustrating the signaling messages in the preferred embodiment involved in delivering a call with an enhanced service to a subscriber in a cellular telecommunications network having the IMS of the present invention, and in which the IMS is available to receive an incoming call;

FIG. 6 is a message flow diagram illustrating the signaling messages in the preferred embodiment involved when a service is delivered to the IMS of the present invention, followed by call diversion to a non-intelligent mobile station in a cellular telecommunications network;

FIG. 7 is a message flow diagram illustrating the signaling messages in the preferred embodiment involved in delivering a call with an enhanced service to a subscriber in a cellular telecommunications network having the IMS of the present invention, and in which the IMS is busy with an ongoing call, but utilizes call waiting to place the ongoing call on hold while receiving the incoming call;

DETAILED DESCRIPTION OF EMBODIMENTS

The present invention is a system which decentralizes the intelligent network (IN) storage and execution of finctions in a plurality of intelligent mobile stations (IMSs) in a cellular telecommunications network. The system is also backwards-compatible with non-intelligent mobile stations. The IMS of the present invention provides cellular subscribers with the capability to define and implement customized subscriber services through their IMS.

Figure 2:
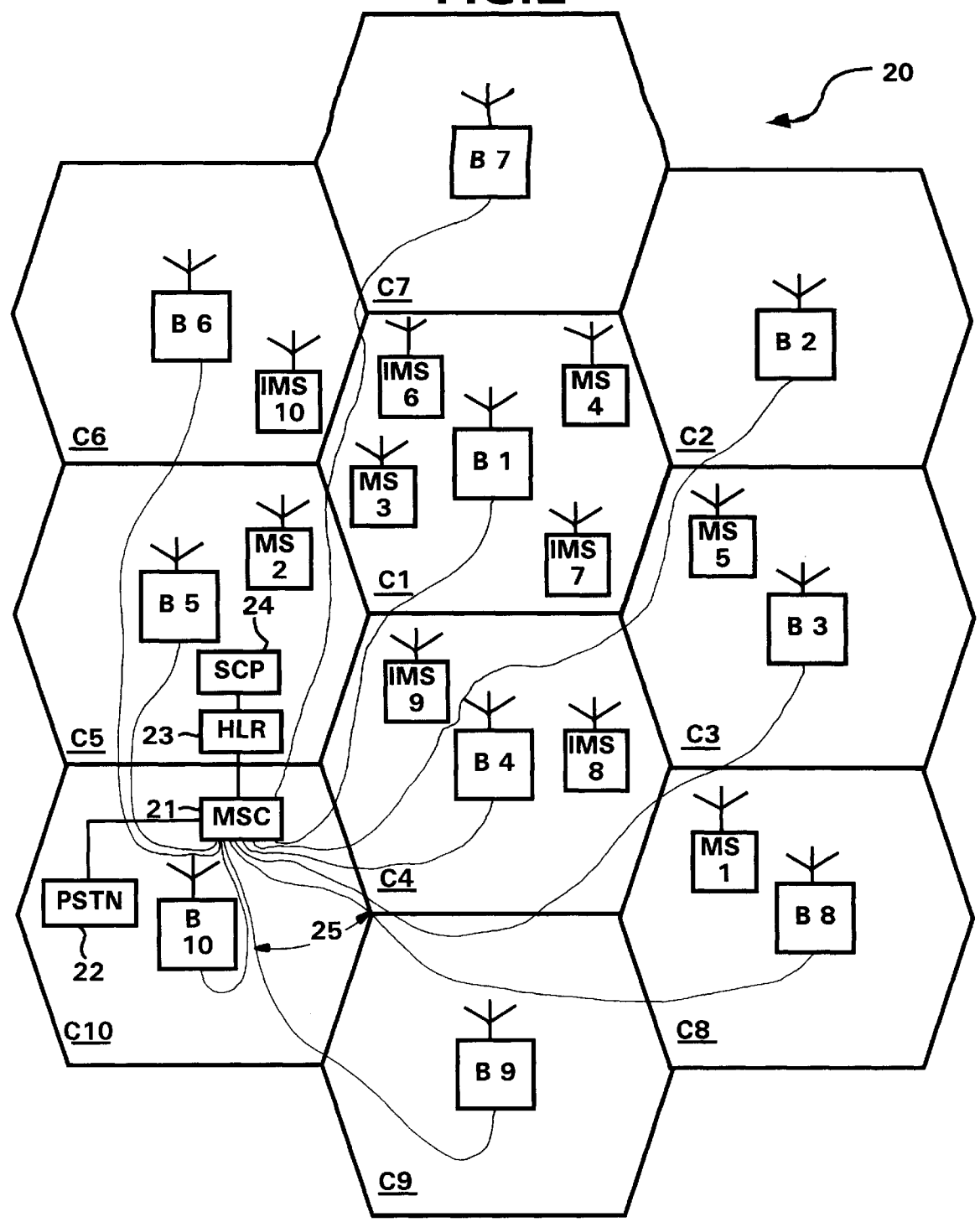
FIG. 2 is a block diagram illustrating components of a cellular radio telecommunications network associated with the present invention.

FIG. 2 is a block diagram illustrating components of a cellular radio telecommunications network 20 associated with the present invention. In FIG. 2, an arbitrary geographic area may be divided into a plurality of continuous radio coverage areas, or cells C1–C10. Although the network of FIG. 2 is illustratively shown to only include 10 cells, it should be clearly understood that in practice, the number of cells could be much larger.

Associated with and located within each of the cells C1–C10, is a base station designated as a corresponding one of a plurality of base stations B1–B10. Each of the base stations B1–B10 includes a transmitter, receiver, and a base station controller as are well known in the art. In FIG. 2, the base stations B1–B10 are selected to be located at the center of each of the cells C1–C10, respectively, and are equipped with omni-directional antennas. However, in other configurations of a cellular radio network, the base stations B1–B10 may be located near the periphery, or otherwise away from the centers of the cells C1–C10 and may illuminate the cells C1–C10 with radio signals either omni-directionally or directionally. Therefore, the representation of the cellular radio network of FIG. 2 is for purposes of illustration only and is not intended as a limitation on the possible implementations of a system for providing enhanced subscriber services in a mobile radio telecommunications network.

With continuing reference to FIG. 2, a plurality of non-intelligent mobile stations MS1–MS5 and a plurality of intelligent mobile stations IMS6–IMS10 may coexist within the cells C1–C10 of the network. Again, a total of only ten mobile stations are shown in FIG. 2, but it should be understood that the actual number of mobile stations may be much larger and, in practice, will invariably greatly exceed the number of base stations. Moreover, mobile stations MS1–MS5 and IMS6–IMS10 are illustrated in some of the cells C1–C10. The presence or absence of mobile stations in any particular one of the cells C1–C10 should be understood to depend, in practice on the individual desires of subscribers utilizing the mobile stations. Subscribers may roam from one location in a cell to another, or from one cell to an adjacent cell or neighboring cell, and even from one cellular radio network served by a mobile switching center (MSC) 21 to another such network all the while receiving and placing calls both within the cellular network 20 as well as the public switch telecommunication network (PSTN) 22 which is connected to the MSC 21.

The MSC 21 may also have associated with it a home location register (HLR) 23 which may be physically separate or connected to the MSC. The HLR 23 serves as a database of subscriber information for roaming subscribers. The HLR contains all the mobile subscriber data, such as subscriber identity, supplementary services, bearer services, and location information necessary to route incoming calls. The HLR 23 may be interconnected with a service control point (SCP) 24 which stores and retrieves intelligent network (IN) services for subscribers who subscribe to those services. The HLR may be shared by a group of MSC's. Similarly, the SCP may be shared by a group of HLRs, or conversely, many SCPs may be required for one HLR. Networks employing digital services may also include a message center (MC) (not shown) for storage and routing of short message service (SMS) messages.

Figure 1:
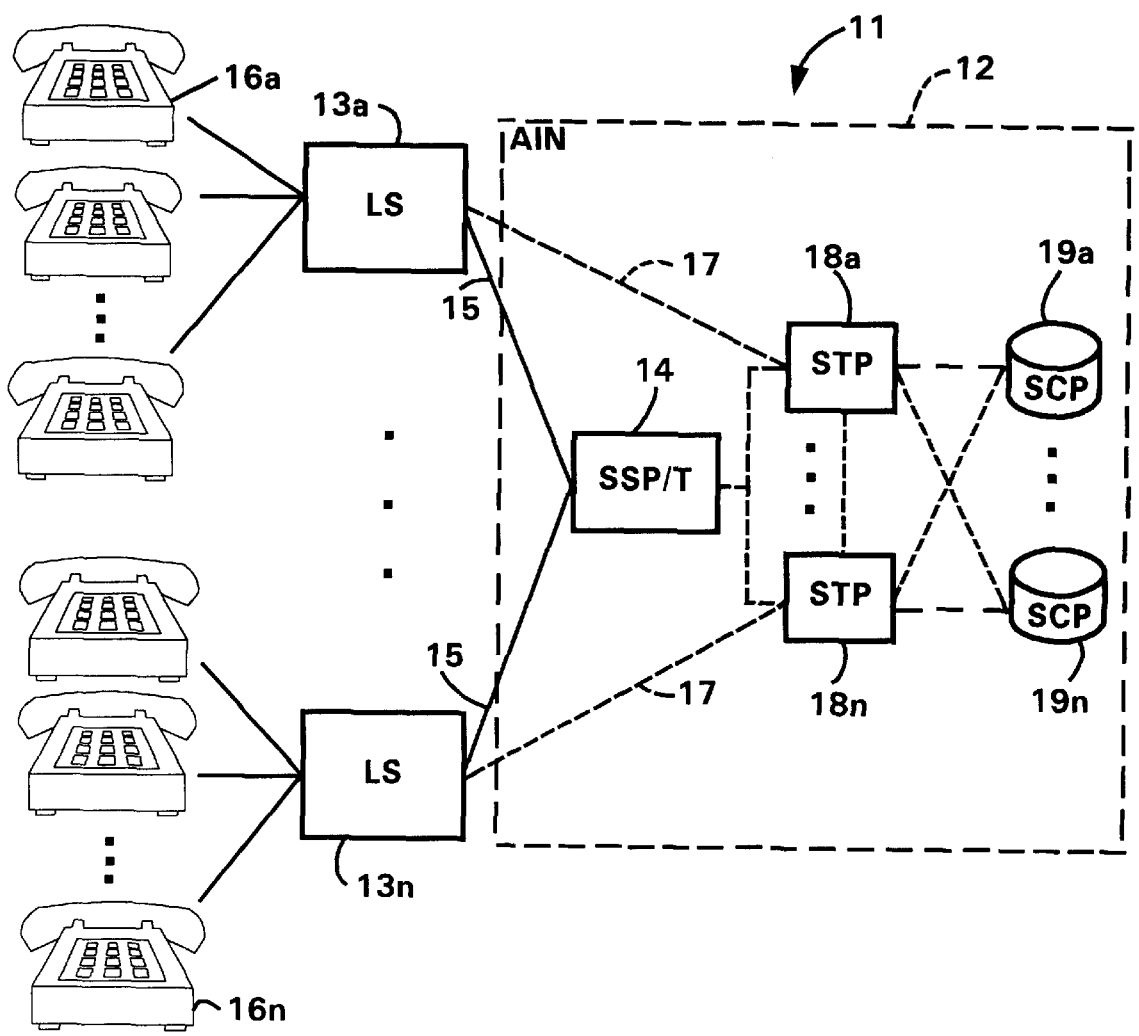
FIG. 1 (Prior art) is a simplified block diagram of a typical wireline telecommunication system using an Intelligent Network (IN) to provide enhanced subscriber services.

Each of the mobile stations MS1–MS5 and IMS6–IMS10 is capable of initiating or receiving a telephone call through one or more of the base stations B1–B10 and the MSC 21. Such calls may be either for voice or data communications. The MSC 21 is connected by communication links 25 (e.g., microwave link or cables) to each of the illustrative base stations B1–B10 and the PSTN 22 or a similar fixed network which may be include an integrated services digital network (ISDN) facility (not shown). The relevant connections between the MSC 21 and the base stations B1–B10, or between the MSC 21 and the PSTN 22, are not completely shown in FIG. 1 but are well known to those of ordinary skill in the art. Similarly, it is also known to include more than one mobile switching center DISC) in the cellular radio network and to connect each additional MSC to a different group of base stations and to other MSCs, HLRs, SCPs, and MCs via cables or radio links.

Each of the cells C1–C10 is allocated a plurality of voice channels for transmission of speech and data (e.g. binary file transfers, facsimile transmissions, etc.), and at least one access or control channel, such as a forward control channel (FOCC). The control channel is used to control or supervise the operation of the mobile station by means of information transmitted and received from those units, referred to as messages. Control and administration messages within a cellular radio network are sent in accordance with extensions of industry air interface standards, such as IS-136 for digital cellular operations, which is hereby incorporated by reference herein. Integrated services between different cellular telecommunication systems are provided by using the intersystem specification IS-41, which is hereby incorporated by reference herein. While these standards govern North American cellular operations, similar standards, such as GSM, which generally govern cellular operations in other geographic areas throughout the world, are beginning to be utilized in North America to offer such services as Personal Communication Services (PCS). These standards are well known to those skilled in the art, and will not be further elaborated upon herein.

The information exchanged between base stations and mobile stations via messages, may include incoming call signals, outgoing call signals, paging signals, paging response signals, location registration signals, voice channel assignments, maintenance instructions, Short Message Service (SMS) messages, and handoff instructions as the mobile stations travel out of the radio coverage of one cell and into the radio coverage of other cells, as well as other additional items of information such as calling party numbers, time information, and the like.

Figure 3:
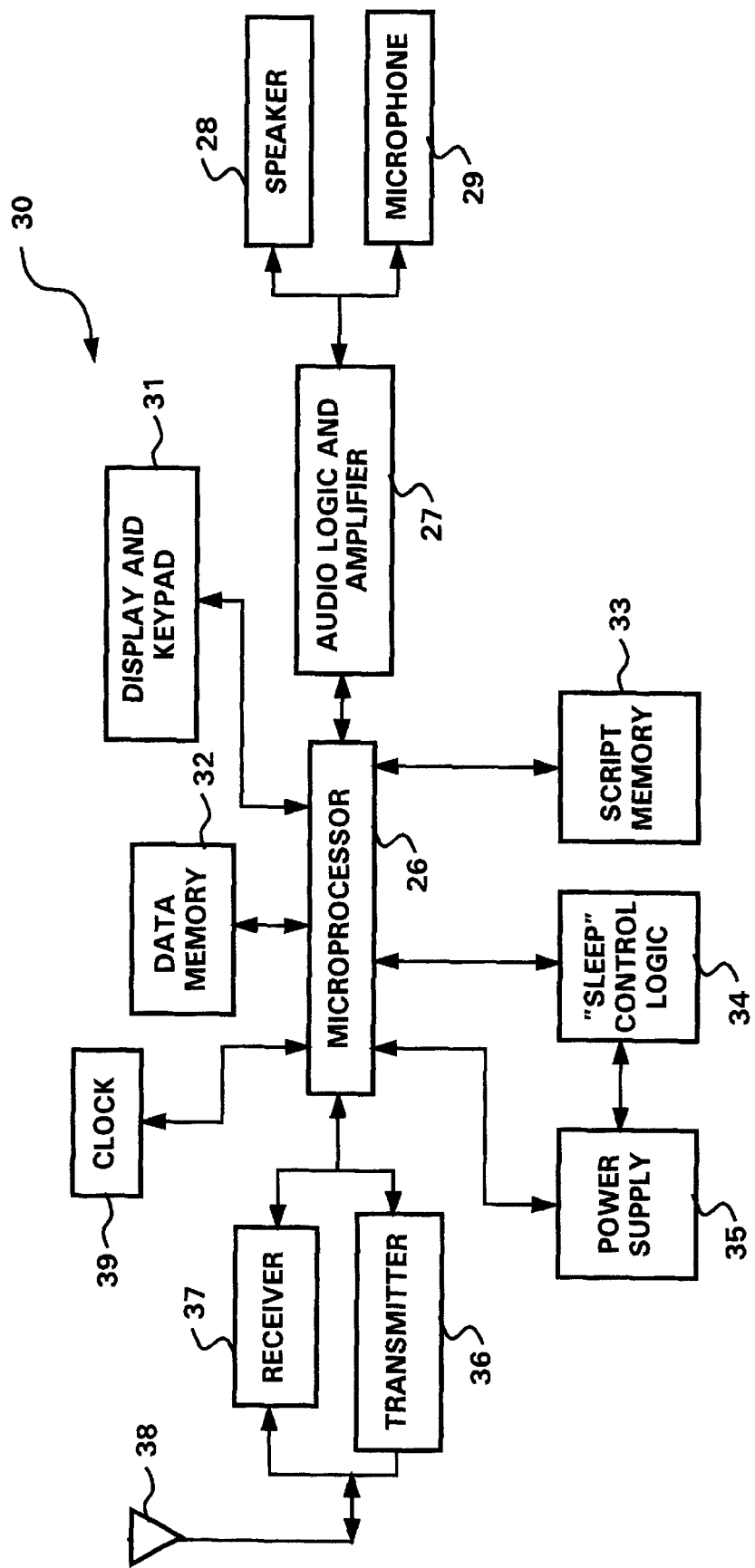
FIG. 3 is a simplified block diagram of an exemplary embodiment of an intelligent mobile station (IMS) of the present invention.

FIG. 3 is a simplified block diagram of an exemplary embodiment of an intelligent mobile station (INS) 30 of the present invention. The fimctions of the IMS 30 are controlled by a microprocessor 26. An audio logic and amplifier circuit 27, in turn controls a speaker 28 and a microphone 29 through which the subscriber may communicate through the IMS and the cellular telecommunications network with other subscribers. The subscriber may additionally receive information and input information through a display and keypad subsystem 31.

The IMS 30 also includes two memory devices, a data memory 32 and a script memory 33. The data memory 32 may be a standard memory device utilized in existing mobile stations. In addition to the current information stored within mobile station data memories, the data memory 32 stores script-related data required for implementation of service script logic. The script memory 33 stores service scripts which are blocks of logic utilized to build the logic for selected IN services. A "sleep" control logic subsystem 34 determines when the IMS may operate at a reduced power level in order to prolong the life of the power supply 35. The sleep control logic coordinates with the microprocessor 26 to shut down non-essential components of the IMS during periods of non-use.

The IMS 30 also includes a transmitter 36 and a receiver 37, both of which are connected to an antenna 38. In addition to current transmitter functions, the transmitter 36 enables the IMS 30 to query the cellular network or the PSTN for script logic or script-related data. In addition, network instructions for carrying out selected IN services are transmitted from the IMS to the cellular network or the PSTN. The receiver 37 enables the IMS 30 to receive downloaded script logic or script-related data from the cellular network or PSTN. Finally, a system clock 39 controls the overall taming of finctions performed by the microprocessor 26 and the IMS 30.

HFG. 4 is a message flow diagram illustrating the signaling messages involved in delivering a call with an enhanced service performed in the cellular network or the PSTN to a subscriber in an existing cellular telecommunications network having access to a service control point (SCP) 41. The signaling varies slightly for calls originating from other mobile stations, as is well known in the art. In existing telecommunications networks, the service logic for IN services is executed entirely in the cellular network (e.g., in the HLR and/or SCP), or in intelligent nodes in the PSTN.

Figure 4:
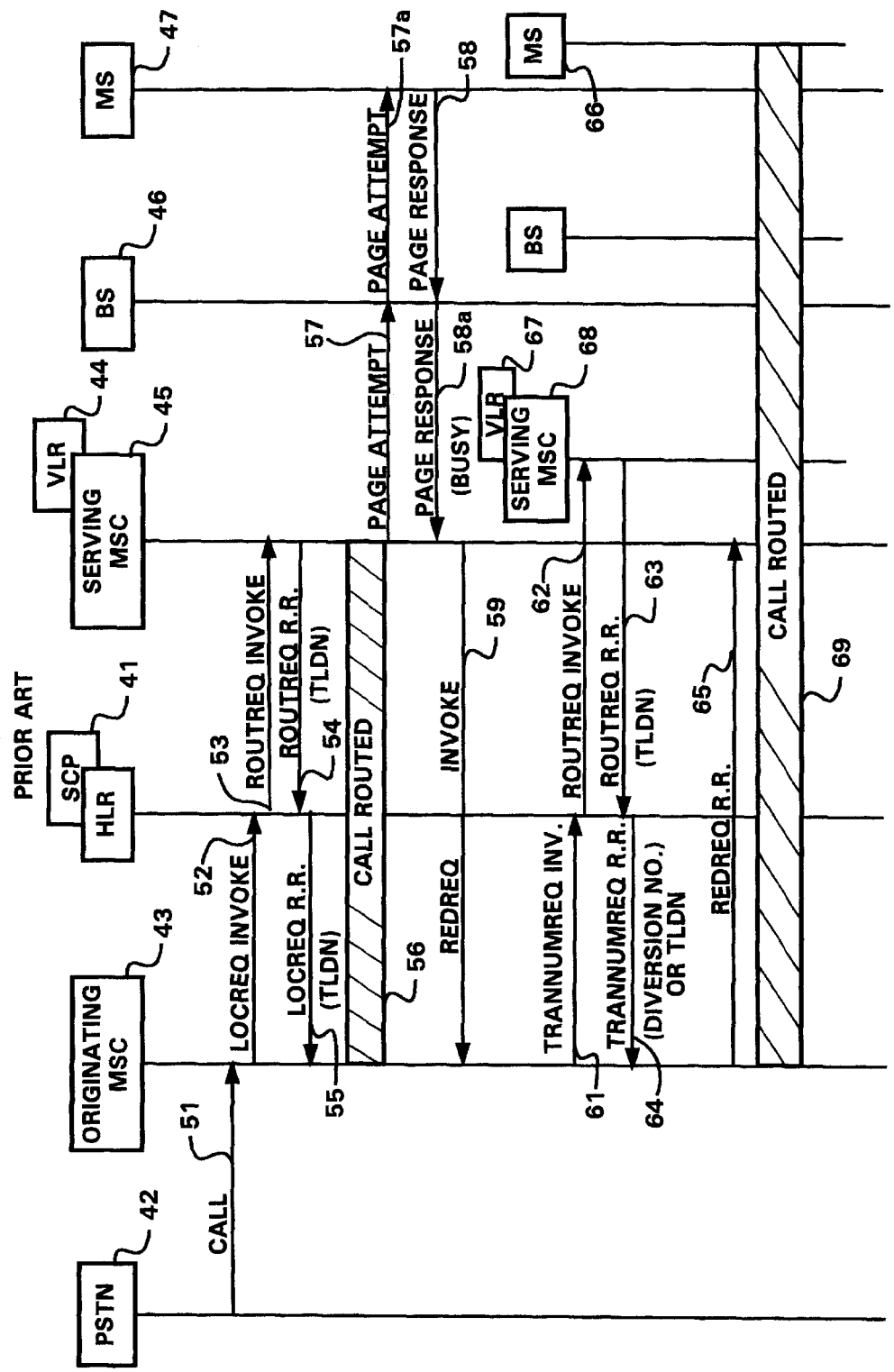
FIG. 4 (Prior Art) is a message flow diagram illustrating the signaling messages involved in delivering a call with an enhanced service to a subscriber in an existing cellular telecommunications network having access to a service control point (SCP)

In FIG. 4, the SCP is illustrated and referred to as a single entity combined with an HLR. The SCP may either be physically co-located with the HLR, or may be separated from the HLR and accessed through an IS-41 based protocol residing on a Signaling System 7 (SS7) platform, or may be accessed by the HLR through an interface with a wireline IN network (not shown). The illustrated signaling is between the PSTN 42, an originating MSC 43, the HLR/SCP 41, a visited location register (VLR) 44 and serving MSC 45, a base station 46, and a mobile station (MS) 47. The VLR 44 may be physically co4ocated with the serving MSC 45 or may be physically separated and connected through signaling lines.

At 51, an incoming call from, for example, the PSTN 42, is presented to the cellular originating MSC 43. The originating MSC transmits an IS-41 Location Request (LOCREQ) Invoke message 52 to the HLR/SCP 41 associated with the mobile station 47. The HLR/SCP, in turn, transmits an IS-41 Routing Request (ROUTREQ) Invoke message 53 to the VLR 44 and serving MSC 45 in which the mobile station is currently located. The serving MSC 45 and VLR 44 return a Temporary Location Directory Number (TLDN) to thle HLR/SCP 41 via an IS-41 ROUTREQ Return Result message 54. The HLR/SCP, in turn, transmits the incoming TLDN to the originating MSC 43 via an IS-41 LOCREQ Return Result message 55. Thereafter, the originating MSC 43 routes the call at step 56 to the serving MSC 45 corresponding to the TLDN.

Upon receipt of the call, the serving MSC 45 sends a page attempt 57 to the base station 46 and page attempt 57*a* to the mobile station 47 to determine the mobile station's availability to receive the call. If the mobile station's page response 58 and 58*a* indicates that the mobile station is busy and cannot accept another call, thle serving MSC 45 transmits an IS-41 Redirection Request (REDREQ) Invoke message 59 to the originating MSC 43. The originating MSC transmits an IS-41 Transfer-to-Number Request (TRANNUMREQ) Invoke message 61 to the HLR/SCP 41 requesting further call processing instructions.

In response, the HLR/SCP retrieves an appropriate diversion number (e.g. forward-to number) from its database. If the diversion number corresponds to a mobile station 66 controlled by the HLR/SCP 41, the HLRJSCP sends a ROUITREQ Invoke message 62 to a VLR 67 of a serving MSC 68, which may be different than the VLR 44 and serving MSC 45. The VLR 67 returns a TLDN for the diversion number in a ROUTREQ Return Result message 63. The HLR/SCP forwards the TLDN to the originating MSC 43 via an IS-41 TRANNUMEREQ Return Result message 64. If the diversion number does not correspond to a mobile station controlled by the HLR/SCP 41, the HLR/SCP forwards the appropriate diversion number to the originating MSC 43 via the IS-41 TRANNUNREQ Return Result message 64. Thereafter, the originating MSC transmits an IS-41 REDREQ Return Result message 65 to the serving MSC 45, and at step 69, the originating MSC 43 attempts to establish a call to the diversion number.

It should be noted that the paging process in FIG. 4 is performed after the call is routed to the serving MSC at 56. The paging process may also be performed following the reception of the Routing Request Invoke message 53 at the serving MSC, and before the Routing Request Return Result message 53 is sent to the HLR.

FIG. 5 is a message flow diagram illustrating the signaling messages in the preferred embodiment involved in delivering a call with an enhanced service from the PSTN to a subscriber in a cellular telecommunications network having an intelligent mobile station (IMS) and in which the IMS is available to receive an incoming call. The signaling varies slightly for calls originating from other mobile stations, as is well known in the art. Unlike existing telecommunications networks, the cellular network or PSTN merely provides script-related data to the IMS 30 which then executes the service logic internally within the IMS. The IMS 30 may then issue instructions to the cellular network or the PSTN in order to deliver a requested IN service.

In FIG. 5, the illustrated signaling is between the PSTN 71, an originating MSC 72, an HLRISCP 73, a visited location register (VLR) 74 and serving MSC 75, a base station 76, and an intelligent mobile station (IMS) 77. The SCP may either be physically co4ocated with the HLR, or may be separated from the HLR and accessed through an IS-41 based protocol residing on a Signaling System 7 (SS7) platform, or may be accessed by the HLR through an interface with a wireline IN network (not shown). Additionally, the VLR 74 may be physically co-located with the serving MSC 75 or may be physically separated and connected through signaling lines.

At 81, an incoming call from, for example, the PSTN, is presented to the cellular originating MSC 72. The originating MSC transmits an IS-41 Location Request (LOCREQ) Invoke message 82 to the HLR/SCP 73 associated with the IMS 77. The HLR/SCP transmits a new IS-41 message referred to as a Call Delivery Network (CALL DEL__NET) Invoke message 83 to the VLR 74 and serving MSC 75 in which the IMS 77 is currently located. The CALL DEL__NET message 83 contains parameters describing the originating party (e.g., calling number, name, location, time zone, etc.) and the call status (e.g., normal, urgent, etc.). The IMS's call diversion treatment (e.g., call forwarding busy number, voice mail box number, call transfer schedule, etc.) may be transmitted to the serving MSC 75 upon registration via, for example, IS-41 messages such as a Registration Notification (REGNOT) Return Result, Qualification Request (QUALREQ) Return Result, or Qualification Directive (QUALDIR) Invoke message. After the MSC 75 extracts the call diversion treatment and other script-related data, the call diversion treatment and other script-related data are retransmitted to the IMS via the air interface. The IMS's call diversion treatment may also be transmitted to the serving MSC as part of the CALL DEL__NET message 83, and then retransmitted with other script-related data to the IMS via the air interface.

The serving MSC forwards the incoming CALL DEL__NET parameters via the base station 76 to the IMS 77 in a Call Delivery Air Interface (CALL DEL__AIR) Invoke message 84 and 84*a*. The IMS's call diversion treatment parameters may be incorporated in the CALL DEL__AIR message or may have been supplied to the IMS upon registration. At 85, the IMS then analyzes its availability to receive the incoming call. An exemplary routine for determining availability to receive the incoming call is illustrated in the flow chart of FIG. 9.

If the IMS is able to receive the call (e.g., is not busy, is busy but can accept a call waiting, answers to paging, etc.)

the IMS indicates its status to the serving MSC 75 through a CALL DEL__AIR Return Result message 86 and 86a sent via the base station 76. The VLR/serving MSC then sends a CALL DEL__NET Retun Result message 87 to the HLR/SCP 73 and includes the IMS's availability to receive the incoming call and a TLDN. The HLR/SCP forwards the TLDN to the originating MSC 72 in a LOCREQ Return Result message 88. At 89, the originating MSC 72 routes the call to the IMS 77.

FIG. 6 is a message flow diagram illustrating the signaing messages in the preferred embodiment involved in delivering a call with an enhanced service from the PSTN to a subscriber in a cellular telecommunications network having an intelligent mobile station (IMS) and in which the IMS is not available to receive an incoming call, and the call is diverted to a non-intelligent mobile station. Like FIG. 5, the illustrated signaling in FIG. 6 is between the PSTN 71, the originating MSC 72, the HLR/SCP 73, the visited location register (VLR) 74 and serving MSC 75, the base station 76, and the IMS 77. The SCP may either be physically co-located with the HLR, or may be accessed by the HLR through an interface with a wireline AIN network (not shown). Additionally, the VLR 74 may be physically co-located with the serving MSC 75 or may be physically separated and connected through signaling lines.

At 91, an incoming call from, for example, the PSTN, is presented to the cellular originating MSC 72. The originating MSC transmits an IS-41 Location Request (LOCREQ) Invoke message 92 to the HLR/SCP 73 associated with the IMS 77. The HLR/SCP transmits a Call Delivery Network (CALL DEL__NET) Invoke message 93 to the VLR 74 and serving MSC 75 in which the IMS 77 is currently located. The CALL DEL__NET message 93 contains parameters describing the originating party (e.g., calling number, name, location, time zone, etc.) and the call status (e.g., normal, urgent, etc.). The IMS's call diversion treatment (e.g., call forwarding busy number, voice mail box number, call transfer schedule, etc.) may be transmitted to the serving MSC 75 upon registration via, for example, IS-41 messages such as a Registration Notification (REGNOT) Return Result, Qualification Request (QUALREQ) Return Result, or Qualification Directive (QUALDIR) Invoke message. The IMS's call diversion treatment may also be transmitted to the serving MSC as part of the CALL DEL__NET message 93.

The serving MSC forwards the incoming CALL DEL__NET parameters via the base station 76 to the IMS 77 in a Call Delivery Air Interface (CALL DEL__AIR) Invoke message 94 and 94a. The IMS's call diversion treatment parameters may be incorporated in the CALL DEL__AIR message or may have been supplied to the IMS upon registration. At 95, the IMS then analyzes its availability to receive the incoming call. An exemplary routine for determining availability to receive the incoming call is illustrated in the flow chart of FIG. 9.

If the IMS 77 cannot receive the call at 95 (e.g., because the IMS is busy and cannot accept a call waiting, does not answer to paging, etc.), the IMS determines the appropriate call diversion treatment (e.g., forward call to another number, forward call to voice mail, request caller to input a PIN, etc.) from its own internal database and indicates it to the serving MSC 75 in a CALL DEL__AIR Return Result message 96 and 96a sent via the base station 76. The appropriate call diversion treatment is then forwarded to the HLR/SCP 73 in a CALL DEL__NET Return Result message 97. The HLR/SCP may then follow one of several alternatives, depending on the call diversion treatment requested by the IMS and the status of the forward-to number. If the forward-to number is not for a mobile station, or is for a mobile station that is not known by the HLR/SCP 73, the IHLR/SCP returns the forward-to number to the originating MSC 72 in a LOCREQ Return Result message 98 as shown in alternative "A" in FIG. 6. The originating MSC 72 then routes the call to the forward-to number at 99, likely via the PSTN. If the forward-to number is for a non-intelligent mobile station 101, and that mobile station is known by the HLR/SCP 73, the HLR/SCP follows alternative "B" in FIG. 6. The ILR/SCP, in turn, transmits a ROUTREQ Invoke message 102 to the VLR 104 and serving MSC 103 in which the mobile station is currently located. It should be noted that the illustration of the non-intelligent mobile station in serving MSC 103 does not preclude the situation in which the mobile station is in serving MSC 75 or VLR 74. The serving MSC 103 and VLR 104 return a TLDN to the HLRISCP 73 via a Routing Request Return Result message 105. The HLR/SCP then forwards the TLDN to the originating MSC 72 in a LOCREQ Return Result message 106, and the originating MSC 72 routes the call to the TLDN at 107.

FIG. 7 is a message flow diagram illustrating the signaling messages in the preferred embodiment involved in delivering an incoming call 111 with an enhanced service to a subscriber in a cellular telecommunications network having the IMS 77 of the present invention, and in which the IMS is busy with an ongoing call 110, but utilizes call waiting to place the ongoing (1st) call on hold while receiving the incoming (2nd) call. In FIG. 7, the ongoing call 110 originated in the PSTN 71 and was connected through originating MSC-1 72. Thereafter, the incoming call 111 is received from the PSTN 71 at a second originating MSC-2 78. MSC-2 transmits an IS-41 Location Request (LOCREQ) Invoke message 112 to the HLRISCP 73 associated with the IMS 77. The HLR/SCP transmits a Call Delivery Network (CALL DEL__NET) Invoke message 113 to the VLR 74 and serving MSC 75 in which the IMS 77 is currently located. The CALL DEL__NET message 113 contains parameters describing the originating party (e.g., calling number, name, location, time zone, etc.) and the call status (e.g., normal, urgent, etc.). The IMS's call diversion treatment may also be transmitted to the serving MSC as part of the CALL DEL__NET message 113.

The serving MSC forwards the incoming CALL DEL__NET parameters via the base station 76 to the IMS 77 in a Call Delivery Air Interface (CALL DEL__AIR) Invoke message 114 and 114a. The IMS's call diversion treatment parameters may be incorporated in the CALL DEL__AIR message or may have been supplied to the IMS upon registration. At 115, the IMS then analyzes its availability to receive the incoming call. An exemplary routine for determining availability to receive the incoming call is illustrated in the flow chart of FIG. 9.

At 116 and 116a, the IMS 77 sends a CALL DEL__AIR Return Result message to the base station and serving MSC indicating that the IMS is available to receive the incoming call 111, and the ongoing (1st) call 110 should be placed on hold. The serving MSC sends a CALL DEL__NET Return Result message 117 to the HLR/SCP 73 indicating that the IMS is available, and including a TLDN. The HLR/SCP sends a Location Request Return Result message 118 to the originating MSC-2 78 and includes the TLDN. The incoming (second) call is then connected from the originating MSC-2 to the serving MSC 75 at 119. The serving MSC then executes its instructions at 120 and holds the ongoing (first) call, and connects the incoming (second) call to the IMS.

Figure 8B:
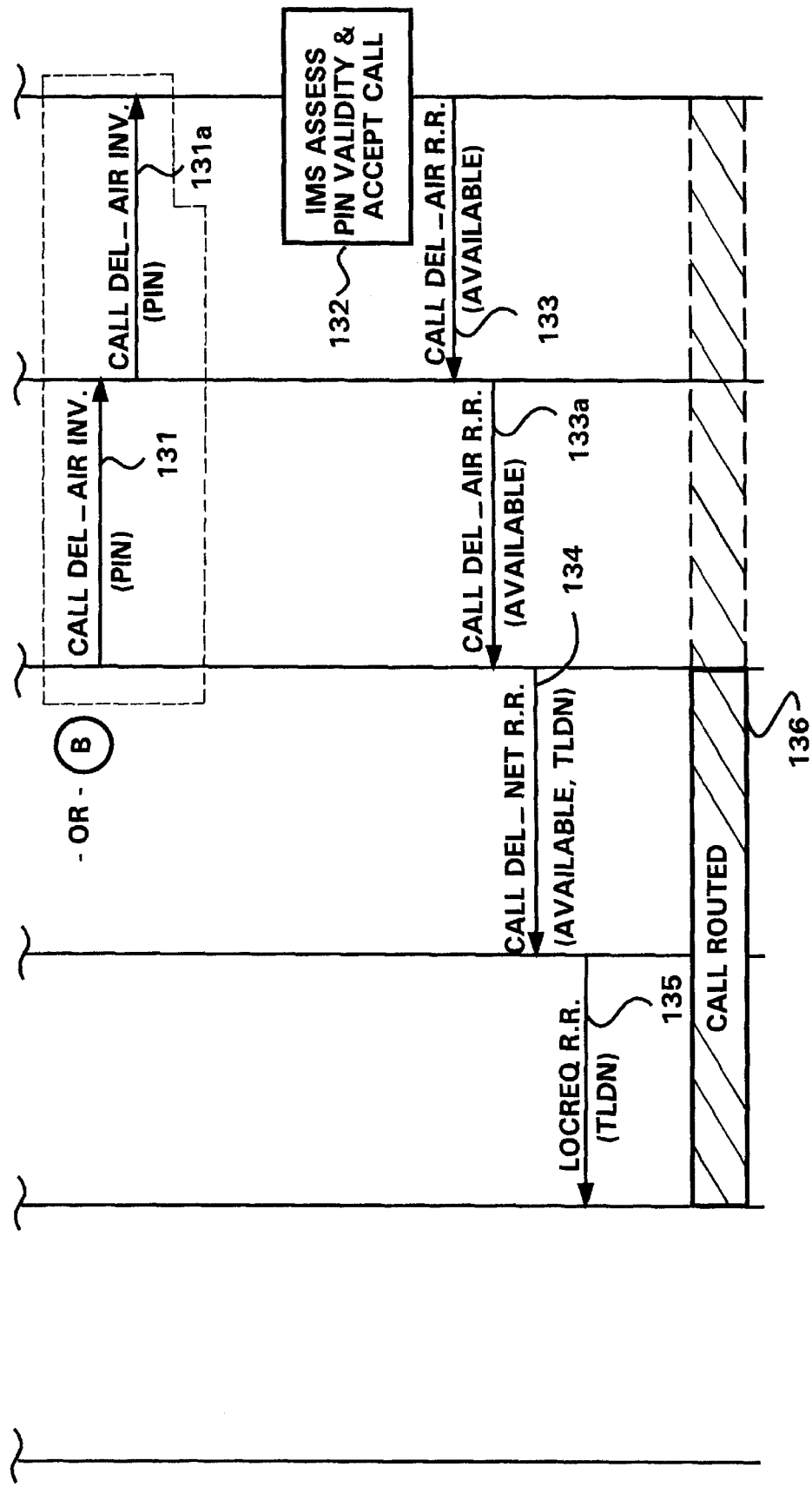
FIG. 8 is a message flow diagram illustrating the signaling messages in the preferred embodiment involved in delivering a call with an enhanced service to a subscriber in a cellular telecommunications network having the IMS of the present invention, and in which a valid personal identification number (PIN) must be entered by the calling party before the call is connected.

FIG. 8 is a message flow diagram illustrating the signaling messages in the preferred embodiment involved in delivering a call 121 with an enhanced service to a subscriber in a cellular telecommunications network having the IMS 77 of the present invention, and in which a valid personal identification number (PIN) must be entered by the calling party before the call is connected. The incoming call 121 is received from the PSTN 71 at the originating MSC 72. The originating MSC transmits an IS-41 Location Request (LOCREQ) Invoke message 122 to the HLR/SCP 73 associated with the IMS 77. The HLR/SCP transmits a Call Delivery Network (CALL DEL_NET) Invoke message 123 to the VLR 74 and serving MSC 75 in which the IMS 77 is currently located. The CALL DEL_NET message 123 contains parameters describing the originating party (e.g., calling number, name, location,. time zone, etc.) and the call status (e.g., normal, urgent, etc.). The IMS's call diversion treatment may also be transmitted to the serving MSC as part of the CALL DEL_NET message 123.

The serving MSC forwards the incoming CALL DEL_NET parameters via the base station 76 to the IMS 77 in a Call Delivery Air Interface (CALL DEL_AIR) Invoke message 124 and 124a. The IMS's call diversion treatment parameters may be incorporated in the CALL DEL_AIR message or may have been supplied to the IMS upon registration. At 125, the IMS then analyzes its availability to receive the incoming call. An exemplary routine for determining availability to receive the incoming call is illustrated in the flow chart of FIG. 9.

At 125, the IMS 77 may determine that it is available to accept a call only if the calling party enters a valid personal identification number (PIN). The IMS returns a CALL DEL_NET Return Result message to the base station and serving MSC at 126 and 126a, instructing that an announcement be played to the calling party requesting the entry of a PIN, and that the PIN be collected and returned to the IMS 77 for analysis. These actions may take place either in the HLR/SCP 73 or in the serving MSC 75 and VLR 74. In alternative A, the actions take place in the HLR/SCP 73 when the serving MSC sends a CALL DEL_NET Return Result message 127 to the HLR/SCP 73. The announcement is then played and the PIN collected. The PIN is returned to the serving MSC in a CALL DEL_NET Invoke message 128. The serving MSC forwards the PIN to the IMS 77 in a CALL DEL_AIR Invoke message 129 and 129a.

In alternative B, the announcement is played, and the PIN is collected in the serving MSC 75 and VLR 74. Therefore, after receipt of the CALL DEL_AIR Return Result message 126a, the announcement is played, and the PIN is collected by the serving MSC 75 and VLR 74. The PIN is then sent to the IMS 77 in a CALL DEL_AIR Invoke message 131 and 131a.

At 132, the IMS 77 assesses the validity of the PIN. If the PIN is not valid, the call is not accepted. If the PIN is valid, the IMS returns a CALL DEL_AIR Return Result message to the serving MSC at 133 and 133a indicating that the IMS is available to receive the call. The serving MSC 75 then returns a CALL DEL_NET Return Result message 134 to the HLR/SCP 73 indicating that the IMS is available, and including a temporary location directory number (OLDN) for the IMS. The HLRJSCP 73 then returns a location request return result message 135 to the originating MSC 72 and includes the TLDN. Thereafter, the call is routed from the originating MSC 72 to the IMS 77 at 136.

Figure 9:
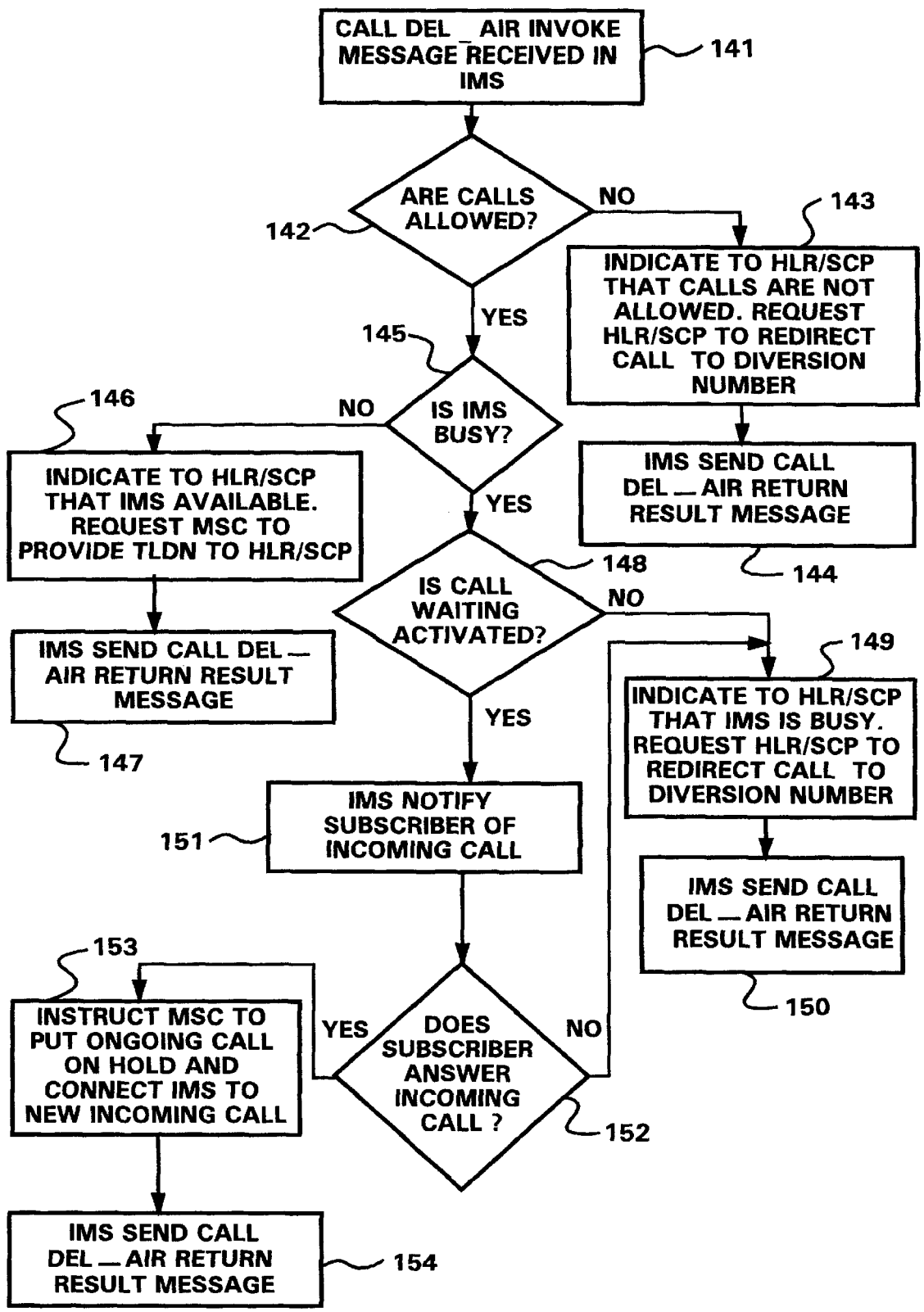
FIG. 9 is a flow chart of an exemplary process by which the IMS of the present invention may determine its availability to receive an incoming call.

FIG. 9 is a flow chart of an exemplary process by which the IMS 77 of the present invention may determine its availability to receive an incoming call. The process begins at step 141 where a CALL DEL_AIR Invoke message is received in the IMS 77. At step 142, the IMS determines whether or not the IMS subscriber is allowing calls to be received. For example, the IMS subscriber may have activated a "Do Not Disturb" feature, or may have defined a time period during which calls are not allowed. If it is determined that calls are not allowed, the process moves to step 143 where the IMS indicates to the HLR/SCP 73 that calls are not allowed, and requests the BLR/SCP to redirect any incoming calls to a diversion number. These instructions are sent to the HLRISCP via a CALL DEL_AIR Return Result message to the serving MSC, which is forwarded to the HLR/SCP in a CALL DEL_NET Return Result message at step 144. This process is illustrated in steps 96–97 of FIG. 6.

If, however, it is determined at step 142 that the IMS subscriber is allowing calls, then the process moves to step 145 where it is determined whether or not the IMS subscriber is already engaged in a call (i.e., the IMS is busy). If the IMS is not busy, the process moves to step 146 where the IMS indicates to the HLR/SCP 73 that the EMS is available, and requests the serving MSC to provide a TLDN to the HLR/SCP. These instructions are sent to the HLR/SCP via a CALL DEL_AIR Return Result message to the serving MSC, which is forwarded to the HLR/SCP in a CALL DEL_NET Return Result message at step 147. This process is illustrated in steps 86–87 of FIG. 5.

If, however, it is determined at step 145 that the IMS is busy, then the process moves to step 148 where it is determined whether or not the IMS subscriber has activated a call waiting feature. If call waiting is not activated, the process moves to step 149 where the IMS indicates to the HLR/SCP 73 that the IMS is busy and calls are not allowed. The IMS requests the HLR/SCP to redirect any incoming calls to a diversion number. These instructions are sent to the HLR/SCP via a CALL DEL_AIR Return Result message to the serving MSC, which is forwarded to the HLR/SCP in a CALL DEL_NET Return Result message at step 150. This process is illustrated in steps 96–97 of FIG. 6.

If, however, it is determined at step 148 that call waiting is not activated, then the process moves to step 151 where the IMS notifies the IMS subscriber that there is an incoming call. This may be accomplished, for example, by providing the IMS subscriber with a tone during the ongoing call. At step 152, it is determined whether or not the IMS subscriber answers the incoming call. If the IMS subscriber does not answer the incoming call, the process returns to step 149 where the IMS indicates to the HLR/SCP 73 that the IMS is busy and calls are not allowed. The IMS requests the HLR/SCP to redirect any incoming calls to a diversion number. These instructions are sent to the HLR/SCP via a CALL DEL_AIR Return Result message to the serving MSC, which is forwarded to the HLRISCP in a CALL DEL_NET Return Result message at step 150.

If, however, it is determined at 152 that the subscriber answers the incoming call, the process moves to step 153 where the EMS instructs the serving MSC to put the ongoing (first) call on hold and connect the IMS to the incoming (second) call. These instructions are sent to the HLR/SCP via a CALL DEL_AIR Return Result message to the serving MSC at step 154. Then, as illustrated in steps 116–120 of FIG. 7, the serving MSC sends a CALL DEL_NET Return Result message to the HLR/SCP indicating that the IMS is available, and including a TLDN. The HLRISCP sends a Location Request Return Result message to the originating MSC-2 78 and includes the TLDN. The incoming (second) call is then connected from the originating MSC-2 to the serving MSC 75. The ongoing (first) call is then held, and the incoming (second) call is connected to the IMS.

The following is a non-exhaustive list of exemplary parameters analyzed during the availability analysis by the IMS in FIG. 9:

calendar date and day of week;

calling or called party's identity;

location of calling or called party;

call urgency level;

whether the calling or called party number is on a positive list (i.e., a list of numbers from which calls may be originated or to which calls may be terminated); and whether the calling or called party number is on a negative list (i.e., a list of numbers from which calls may not be originated or to which calls may not be terminated).

The following are examples of the diversion treatment that may be selected by the IMS:

prevent the call from being presented to the IMS user;

accept the call based on the above criteria;

reject the call based on the above criteria;

accept the call even though the IMS subscriber is already engaged in a call;

reject the call because the IMS subscriber is already engaged in a call;

forward the call to a transfer-to number (cellular or PSTN), to a voice announcement system, to a voice mail system, or to a multimedia system (e.g., to a store and forward system for short messages, paging, facsimiles, etc.) based on the above criteria;

allow the call to be originated by the IMS user based on the above criteria.

Example of IMS Operation.

Prior to receiving a call, a mobile subscriber with an intelligent IMS programs his IMS in the following manner:

1. Accept incoming calls at any time with caller's entered PIN=23885.

2. Accept all incoming calls from (123) 456–7890, regardless of the time (e.g., positive list).

3. Accept other incoming calls received between 09:00 and 18:00 (local time of the IMS location).

4. Divert all other incoming calls received between 09:00 and 18:00 to voice mail.

Upon receipt of a Call Delivery Network (CALL DEL__NET) Invoke message indicating an incoming call, the IMS analyzes the IMS's availability to receive the call (e.g., not busy), the incoming call parameters (e.g., the calling number, the local time of day, etc.), and then decides to either accept the call by returning a TLDN, or to divert the call by reporting the IMS unavailability reason and specifying the call diversion treatment to the originating MSC.

Figure 10:
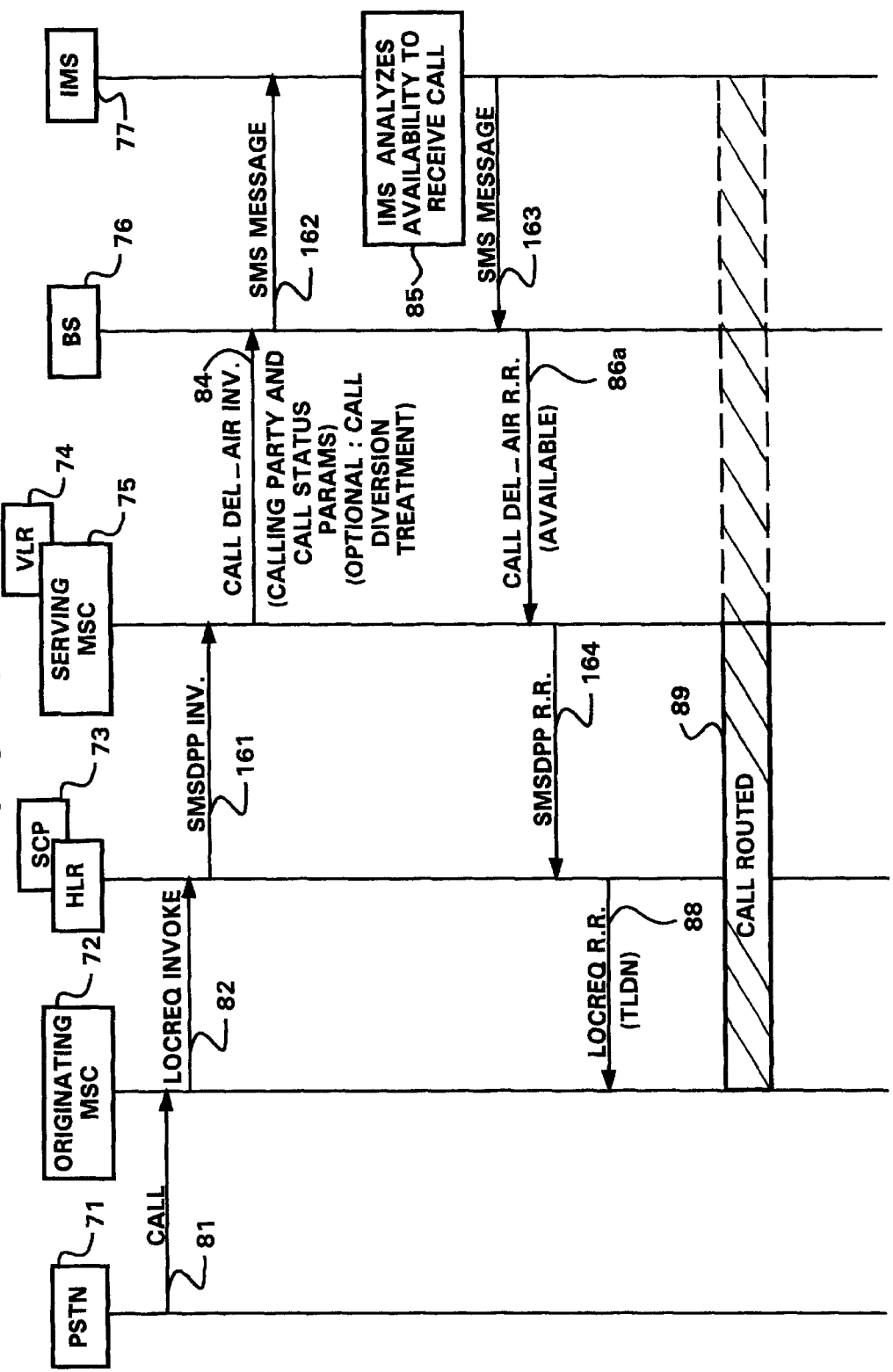
FIG. 10 is a message flow diagram illustrating the signaling messages in an alternative embodiment involved in delivering a call with an enhanced service to a subscriber in a cellular telecommunications network having the IMS of the present invention, and in which the IMS is available to receive an incoming call.

FIG. 10 is a message flow diagram illustrating the signaling messages in an alternative embodiment involved in delivering a call with an enhanced service to a subscriber in a cellular telecommunications network having the IMS of the present invention, and in which the IMS is available to receive an incoming call. The message flow is essentially the same as that shown in FIG. 5, except:

(1) The CALL DEL__NET Invoke message 83 is replaced by a Short Message Service (SMS) Delivery Point to Point (SMSDPP) Invoke message 161. Parameters of the SMSDPP Invoke message are defined in Interim Specification IS-41C, which is hereby incorporated by reference herein;

(2) The CALL DEL__AIR Invoke message 84a between the base station 76 and the EMS 77 is replaced by a SMS message 162 via the air interface;

(3) The CALL DEL__AIR Return Result message 86 between the IMS 77 and the base station 76 is replaced by a SMS message 163 via the air interface; and (4) The CALL DEL__NET Return Result message 87 is replaced by a SMSDPP Return Result message 164. Parameters of the SMSDPP Return Result message are defined in IS-41C.

One of the parameters of the SMSDPP Invoke message defined in IS-41C is the "SMS__Teleserviceidentifier" parameter. Additional values are added to reserved fields in the SMS__Teleserviceidentifier parameter to support IMS signaling.

Figure 11:
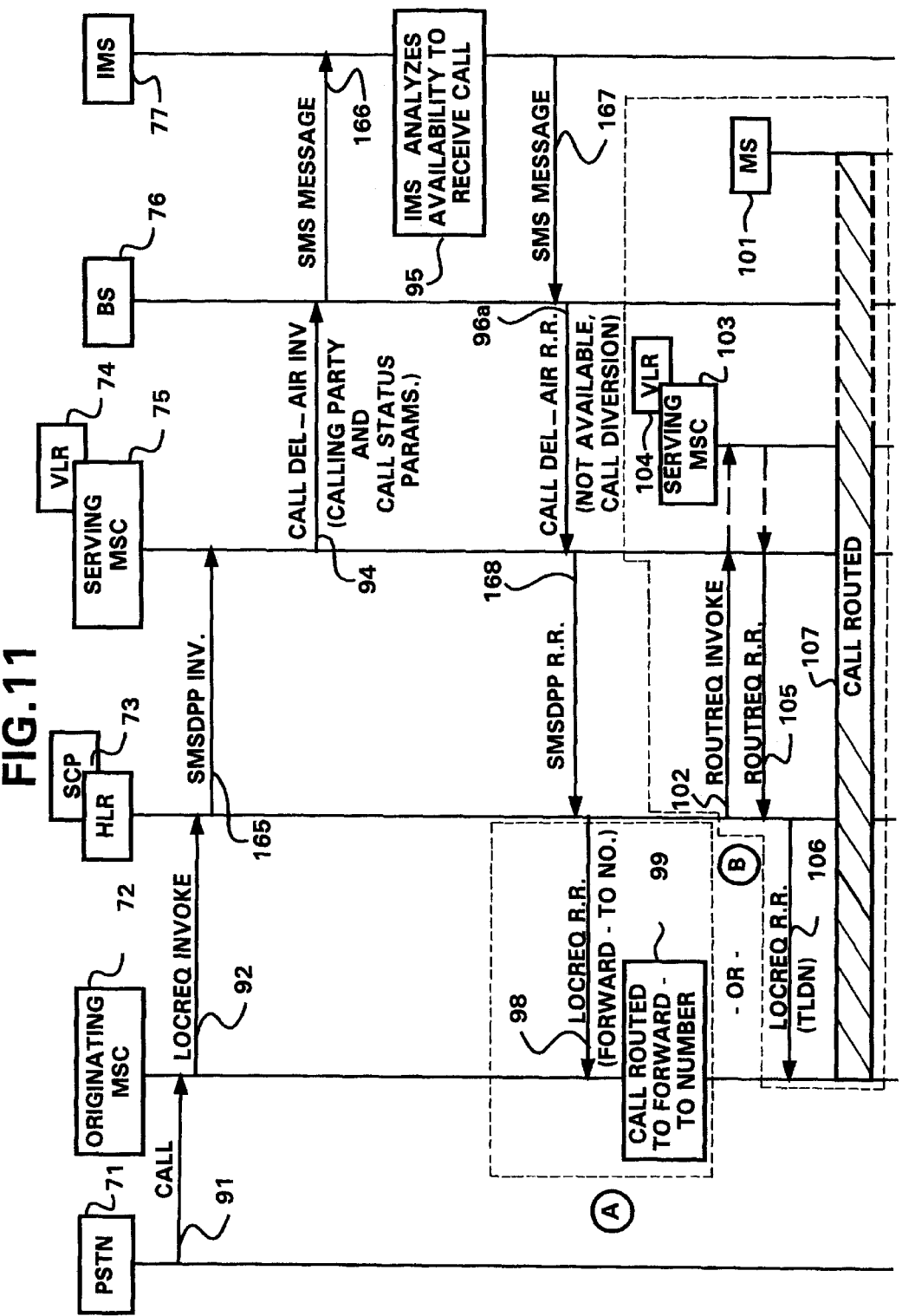
FIG. 11 is a message flow diagram illustrating the signaling messages in an alternative embodiment involved when a service is delivered to the IMS of the present invention, followed by call diversion to a non-intelligent mobile station in a cellular telecommunications network.

FIG. 11 is a message flow diagram illustrating the signaling messages in an alternative embodiment involved when a service is delivered to the IMS of the present invention, followed by call diversion to a non-intelligent mobile station in a cellular telecommunications network. The message flow is essentially the same as that shown in FIG. 6, except:

(1) The CALL DEL__NET Invoke message 93 is replaced by a Short Message Service (SMS) Delivery Point to Point (SMSDPP) Invoke message 165;

(2) The CALL DEL__AIR Invoke message 94a between the base station 76 and the IMS 77 is replaced by a SMS message 166 via the air interface;

(3) The CALL DEL__AIR Return Result message 96 between the IMS 77 and the base station 76 is replaced by a SMS message 167 via the air interface; and (4) The CALL DEL__NET Return Result message 97 is replaced by a SMSDPP Return Result message 168.

Figure 12:
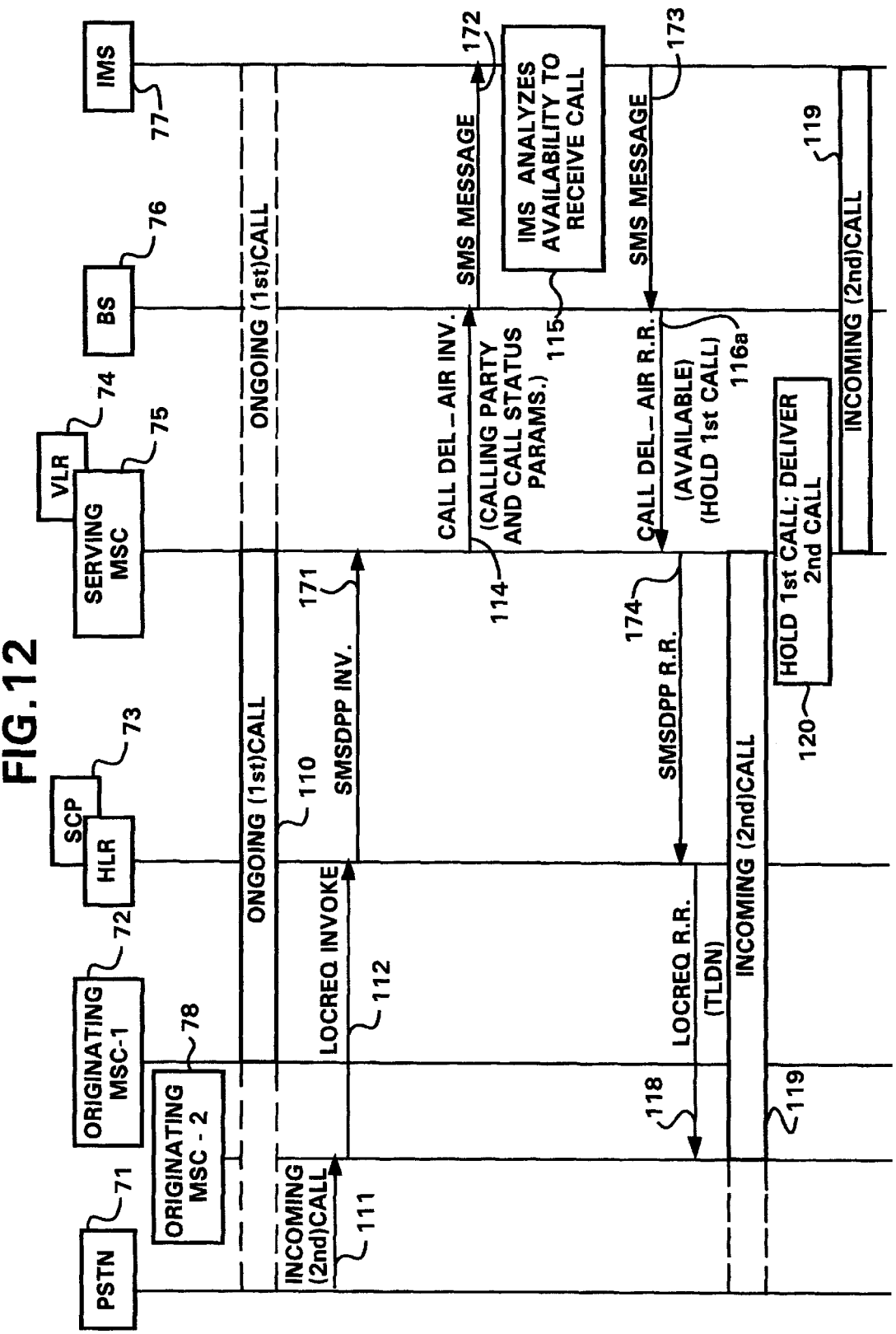
FIG. 12 is a message flow diagram illustrating the signaling messages in an alternative embodiment involved in delivering a call with an enhanced service to a subscriber in a cellular telecommunications network having the IMS of the present invention, and in which the IMS is busy with an ongoing call, but utilizes call waiting to place the ongoing call on hold while receiving the incoming call.

FIG. 12 is a message flow diagram illustrating the signaling messages in an alternative embodiment involved in delivering a call with an enhanced service to a subscriber in a cellular telecommunications network having the IMS of the present invention, and in which the IMS is busy with an ongoing call, but utilizes call waiting to place the ongoing call on hold while receiving the incoming call. The message flow is essentially the same as that shown in FIG. 7, except:

(1) The CALL DEL__NET Invoke message 113 is replaced by a Short Message Service (SMS) Delivery Point to Point (SMSDPP) Invoke message 171;

(2) The CALL DEL__AIR Invoke message 114a between the base station 76 and the IMS 77 is replaced by a SMS message 172 via the air interface;

(3) The CALL DEL__AIR Return Result message 116 between the IMS 77 and the base station 76 is replaced by a SMS message 173 via the air interface; and (4) The CALL DEL__NET Return Result message 117 is replaced by a SMSDPP Return Result message 174.

Figure 13B:
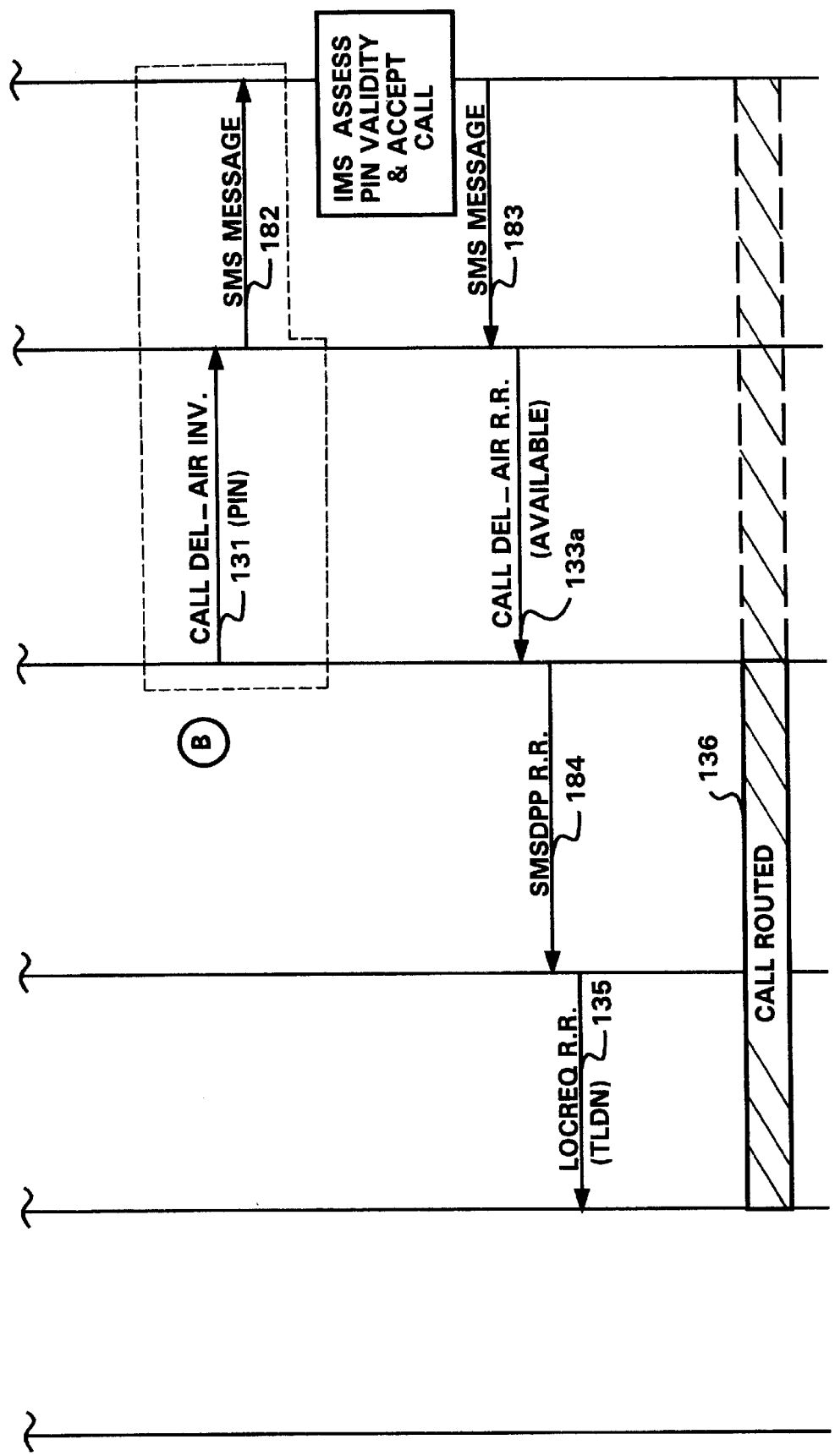
FIG. 13 is a message flow diagram illustrating the signaling messages in an alternative embodiment involved in delivering a call with an enhanced service to a subscriber in a cellular telecommunications network having the IMS of the present invention, and in which a valid personal identification number (PSIN) must be entered by the calling party before the call is connected.

FIG. 13 is a message flow diagram illustrating the signaling messages in an alternative embodiment involved in delivering a call with an enhanced service to a subscriber in a cellular telecommunications network having the IMS of the present invention, and in which a valid personal identification number (PIN) must be entered by the calling party before the call is connected. The message flow is essentially the same as that shown in FIG. 8, except:

(1) The CALL DEL__NET Invoke message 123 is replaced by a Short Message Service (SMS) Delivery Point to Point (SMSDPP) Invoke message 175;

(2) The CALL DEL__AIR Invoke message 124a between the base station 76 and the IMS 77 is replaced by a SMS message 176 via the air interface;

(3) The CALL DEL__AIR Return Result message 126 between the IMS 77 and the base station 76 is replaced by a SMS message 177 via the air interface;

(4) The CALL DEL__NET Return Result message 127 in option A is replaced by a SMSDPP Return Result message 178;

(5) The CALL DEL__NET Invoke message 128 in option A is replaced by a Short Message Service (SMS) Delivery Point to Point (SMSDPP) Invoke message 179;

(6) The CALL DEL__AIR Invoke message 129*a* between the base station 76 and the IMS 77 is replaced by a SMS message 181 via the air interface;

(7) In option B, the CALL DEL__AIR Invoke message 131*a* between the base station 76 and the IMS 77 is replaced by a SMS message 182 via the air interface;

(8) The CALL DEL__AMRReturn Result message 133 between the IMS 77 and the base station 76 is replaced by a SMS message 183 via the air interface; and (9) The CALL DEL__NET Return Result message 134 is replaced by a SMSDPP Return Result message 184.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. In a cellular telecommunications network, an intelligent mobile station that determines call treatment internally and sends call routing instructions to the network for an incoming call, said intelligent mobile station comprising:

a microprocessor that controls the mobile stations determines call treatment, and enables the mobile station to interface with said cellular telecommunications network;

a script memory connected to the microprocessor, said script memory storing service script logic for determining call treatment and creating the call routing instructions; and a data memory connected to the microprocessor for storing script-related data required for executing the service script logic.

2. The intelligent mobile station of claim 1 wherein said telecommunications network is connected to a public switched telephone network (PSTN), and said intelligent mobile station also interfaces with said PSTN.

3. The intelligent mobile station of claim 2 further comprising means for directing said cellular telecommunications network, said PSTN, and a mobile subscriber to provide said script-related data to said intelligent mobile station, said data being utilized to determine the call treatment.

4. The intelligent mobile station of claim 3 further comprising means for providing call routing instructions to network nodes in said cellular telecommunications network and said PSTN.

5. The intelligent mobile station of claim 4 wherein said microprocessor includes means for executing a plurality of steps defined in said service script logic.

6. The intelligent mobile station of claim 3 wherein said means for directing the cellular network the PSTN, and the mobile subscriber to provide said script-related data to the intelligent mobile station includes means for utilizing an intersystem communications protocol.

7. The intelligent mobile station of claim 6 wherein said intersystem communications protocol is based upon IS-41.

8. The intelligent mobile station of claim 3 wherein said means for directing the cellular network, the PSTN, and the mobile subscriber to provide said script-related data to the intelligent mobile station includes means for utilizing short message service (SMS) message signaling.

9. The intelligent mobile station of claim 4 wherein the call routing instructions include call diversion instructions.

10. The intelligent mobile station of claim 9 wherein the call diversion instructions are selected from a group consisting of:

directing that the incoming call be forwarded to a call-forward telephone number;

directing that the incoming call be forwarded to voice mail;

directing that an announcement be played to a calling party, the announcement requesting a personal identification number (PIN);

rejecting the incoming call;

directing that an on-going call be placed on hold and connecting the incoming call;

directing that the incoming call be connected only during an allowable time period; and originating a call in response to receiving the incoming call from a specified calling party.

11. A cellular telecommunications intelligent network comprising:

a mobile switching center;

a home location register having access to at least one service control point; and a plurality of intelligent mobile stations that determine call treatment internally and send call routing instructions to the network for each incoming call, each intelligent mobile station being operated by an associated mobile subscriber, each of said intelligent mobile stations comprising:

a microprocessor that controls the mobile station, determines call treatment, and enables the mobile station to interface with said cellular telecommunications network;

a script memory connected to the microprocessor, said script memory storing service script logic for determining call treatment and creating the call routing instructions; and a data memory connected to the microprocessor for storing script-related data required for executing the service script logic.

12. The cellular telecommunications intelligent network of claim 11 wherein said telecommunications network is connected to a public switched telephone network (PSTN), and each of said intelligent mobile stations also interfaces with said PSTN.

13. The cellular telecommunications intelligent network of claim 12 wherein each of the intelligent mobile stations further comprises means for directing said cellular telecommunications network, said PSTN, and said mobile subscriber to provide said script-related data to said intelligent mobile station, said data being utilized to determine call treatment internally in the intelligent mobile station.

14. The cellular telecommunications intelligent network of claim 13 wherein each of the intelligent mobile stations further comprises means for providing call routing instructions to network nodes in said cellular telecommunications network and said PSTN.

15. The cellular telecommunications intelligent network of claim 14 wherein said microprocessor includes means for executing a plurality of steps defined in said service script logic.

16. The cellular telecommunications intelligent network of claim 14 wherein the call routing instructions are call diversion instructions.

17. The cellular telecommunications intelligent network of claim 16 wherein the call diversion instructions are selected from a group consisting of:

directing that the incoming call be forwarded to a call-forward telephone number;

directing that the incoming call be forwarded to voice mail;

directing that an announcement be played to a calling party, the announcement requesting a personal identification number (PIN);

rejecting the incoming call;

directing that an on-going call be placed on hold and connecting the incoming call;

directing that the incoming call be connected only during an allowable time period; and originating a call in response to receiving the incoming call from a specified calling party.

18. The cellular telecommunications intelligent network of claim 13 wherein said means for directing the cellular network, the PSTN, and the mobile subscriber to provide said script-related data to the intelligent mobile station includes means for utilizing an intersystem communications protocol.

19. The cellular telecommunications intelligent network of claim 18 wherein said intersystem communications protocol is based upon IS-41.

20. The cellular telecommunications intelligent network of claim 13 wherein said means for directing the cellular network, the PSTN, and the mobile subscriber to provide said script-related data to the intelligent mobile station includes means for utilizing short message service (SMS) message signaling.

21. In a cellular telecommunications network, a method of routing a call, said method comprising the steps of:

interfacing an intelligent mobile station (IMS) with said cellular telecommunications network;

providing data to said IMS utilized to determine call treatment;

determining within said IMS, whether the IMS is available to receive the call;

determining call treatment internally within the IMS, upon determining that the IMS is not available to receive the call;

sending call routing instructions from said IMS to the network; and routing the call in accordance with the call routing instructions from the IMS.

22. The method of claim 21 furter comprising the steps of:

connecting said cellular telecommunications network to a public switched telephone network (PSTN); and interfacing said intelligent mobile station with said PSTN.

23. The method of claim 22 wherein said step of providing data to said intelligent mobile station includes directing said cellular telecommunications network, said PSTN, and an associated mobile subscriber to provide data to said intelligent mobile station.

24. The method of claim 23 wherein said step of determining call treatment internally within the IMS includes executing a plurality of steps defined in service scripts stored in the IMS.

25. The method of claim 24 wherein said step of sending call routing instructions from said IMS to the network includes utilizing an intersystem communications protocol.

26. The method of claim 25 wherein said step of utilizing an intersystem communications protocol includes utiiig an intersystem communications protocol based upon IS-41.

27. The method of claim 24 wherein said step of sending call routing instructions from said IMS to the network in short message service (SMS) message signaling.

28. The method of claim 21 wherein the step of sending call routing instructions from the IMS to the network includes sending call diversion instructions.

29. The method of claim 28 wherein the step of sending call diversion instructions from the IMS to the network includes sending call diversion instructions selected from a group consisting of:

directing that the incoming call be forwarded to a call-forward telephone number;

directing that the incoming call be forwarded to voice mail;

directing that an announcement be played to a calling party, the announcement requesting a personal identification number (PIN);

rejecting the incoming call;

directing that an on-going call be placed on hold and connecting the incoming call;

directing that the incoming call be connected only during an allowable time period; and originating a call in response to receiving the incoming call from a specified calling party.

* * * * *